US012626516B2

(12) United States Patent
Medower et al.

(10) Patent No.: US 12,626,516 B2
(45) Date of Patent: May 12, 2026

(54) SITUATIONAL AWARENESS SYSTEMS AND METHODS AND MICROMOBILITY PLATFORM

(71) Applicant: Velios Inc., San Jose, CA (US)

(72) Inventors: Brian Medower, San Jose, CA (US); Harold Russell, Mountain View, CA (US)

(73) Assignee: Velios Inc., San Jose, CA (US)

( * ) Notice: Subject to any disclaimer, the term of this patent is extended or adjusted under 35 U.S.C. 154(b) by 0 days.

(21) Appl. No.: 18/767,712

(22) Filed: Jul. 9, 2024

(65) Prior Publication Data

US 2024/0362925 A1     Oct. 31, 2024

Related U.S. Application Data

(63) Continuation of application No. 18/469,210, filed on Sep. 18, 2023, now Pat. No. 12,051,250.

(60) Provisional application No. 63/488,112, filed on Mar. 2, 2023, provisional application No. 63/382,631, filed on Nov. 7, 2022, provisional application No. 63/376,227, filed on Sep. 19, 2022.

(51) Int. Cl.
| | |
|---|---|
| *G06V 20/58* | (2022.01) |
| *G06T 7/593* | (2017.01) |
| *G06T 7/73* | (2017.01) |
| *G08B 21/18* | (2006.01) |

(52) U.S. Cl.
CPC .............. *G06V 20/58* (2022.01); *G06T 7/593* (2017.01); *G06T 7/74* (2017.01); *G08B 21/182* (2013.01); *G06T 2207/10021* (2013.01); *G06T 2207/30252* (2013.01); *G06V 2201/08* (2022.01)

(58) Field of Classification Search
None
See application file for complete search history.

(56) References Cited

U.S. PATENT DOCUMENTS

| | | | | |
|---|---|---|---|---|
| 10,019,904 | B1 * | 7/2018 | Chan .................. | G06Q 10/0635 |
| 11,648,962 | B1 * | 5/2023 | Crego .................... | G08G 1/166 |
| | | | | 701/26 |
| 11,702,106 | B1 * | 7/2023 | Poubel Orenstein ........................ | |
| | | | | G05D 1/0088 |
| | | | | 701/26 |
| 11,796,326 | B1 * | 10/2023 | Sharma .............. | G01C 21/3407 |
| 11,952,001 | B1 * | 4/2024 | Wang .................... | G05B 17/02 |
| 2018/0075309 | A1 * | 3/2018 | Sathyanarayana ... | G05D 1/0088 |
| 2021/0356288 | A1 * | 11/2021 | Hajj .................. | G01C 21/3492 |

(Continued)

*Primary Examiner* — Stefan Gadomski
(74) *Attorney, Agent, or Firm* — Kolitch Romano Dascenzo Gates LLP

(57)     ABSTRACT

A system for providing situational awareness to a cyclist or other user of a micromobility vehicle comprises a stereo camera assembly and processing logic configured to determine, based on images acquired by the stereo camera assembly, a distance between the cyclist and an object of interest (e.g., a vehicle). The system is configured to determine a threat level of the object based one or more factors such as, e.g., a speed of the object and/or a category of the object. In some examples, the system includes a display and/or an audio indicator to convey information to the cyclist about detected threats. In some examples, the system is configured to produce an audio indication in response to a threat exceeding a threshold threat level. A software platform may be configured to store and/or process micromobility data gathered from one or more users.

18 Claims, 16 Drawing Sheets

340

(56) References Cited

U.S. PATENT DOCUMENTS

| 2023/0053577 | A1* | 2/2023 | Choi | ................. | G01C 21/3484 |
| 2023/0098483 | A1* | 3/2023 | D'Andre | ............. | G08G 1/0116 |
| | | | | | 340/936 |

* cited by examiner

100

270

340

350

VEHICLE - POTENTIAL THREAT
VEHICLE - UNLIKELY THREAT
PERSON / BIKE

370

400

1200

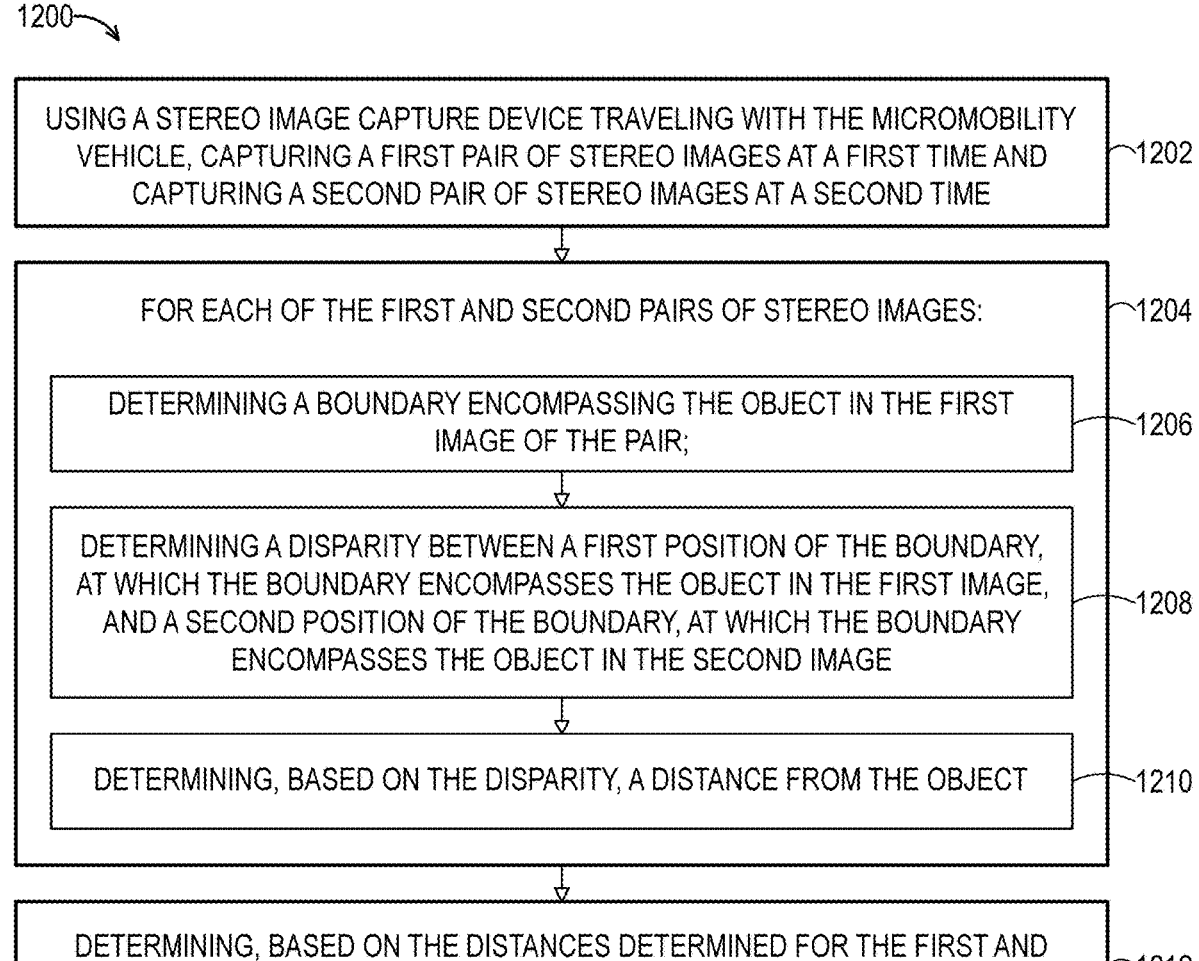

USING A STEREO IMAGE CAPTURE DEVICE TRAVELING WITH THE MICROMOBILITY VEHICLE, CAPTURING A FIRST PAIR OF STEREO IMAGES AT A FIRST TIME AND CAPTURING A SECOND PAIR OF STEREO IMAGES AT A SECOND TIME ~1202

FOR EACH OF THE FIRST AND SECOND PAIRS OF STEREO IMAGES: ~1204

DETERMINING A BOUNDARY ENCOMPASSING THE OBJECT IN THE FIRST IMAGE OF THE PAIR; ~1206

DETERMINING A DISPARITY BETWEEN A FIRST POSITION OF THE BOUNDARY, AT WHICH THE BOUNDARY ENCOMPASSES THE OBJECT IN THE FIRST IMAGE, AND A SECOND POSITION OF THE BOUNDARY, AT WHICH THE BOUNDARY ENCOMPASSES THE OBJECT IN THE SECOND IMAGE ~1208

DETERMINING, BASED ON THE DISPARITY, A DISTANCE FROM THE OBJECT ~1210

DETERMINING, BASED ON THE DISTANCES DETERMINED FOR THE FIRST AND SECOND PAIRS OF STEREO IMAGES, A RATE OF APPROACH OF THE OBJECT ~1212

BASED ON AT LEAST ONE OF THE FIRST AND SECOND IMAGES OF AT LEAST ONE OF THE FIRST AND SECOND PAIRS OF STEREO IMAGES, DETERMINING AN ANGULAR POSITION OF THE OBJECT RELATIVE TO THE MICROMOBILITY VEHICLE; AND DETERMINING A THREAT LEVEL POSED BY THE OBJECT TO THE MICROMOBILITY VEHICLE BASED ON THE RATE OF APPROACH AND THE ANGULAR POSITION OF THE OBJECT ~1214

PRODUCING AN AUDITORY ALERT IN RESPONSE TO DETERMINING A THREAT LEVEL MEETING OR EXCEEDING A THRESHOLD THREAT LEVEL ~1216

DISPLAYING, ON A DISPLAY TRAVELING WITH THE MICROMOBILITY VEHICLE, FIRST DATA INCLUDING THE THREAT LEVEL AND A RELATIVE POSITION OF THE OBJECT TO THE MICROMOBILITY VEHICLE, THE RELATIVE POSITION BEING BASED ON THE DISTANCE FROM THE OBJECT AND THE ANGULAR POSITION OF THE OBJECT ~1218

FIG. 23

SITUATIONAL AWARENESS SYSTEMS AND METHODS AND MICROMOBILITY PLATFORM

CROSS-REFERENCES

The following applications and materials are incorporated herein, in their entireties, for all purposes: U.S. patent application Ser. No. 18/469,210, filed Sep. 18, 2023; U.S. Provisional Patent Application No. 63/488,112, filed Mar. 2, 2023; U.S. Provisional Patent Application No. 63/382,631, filed Nov. 7, 2022; U.S. Provisional Patent Application No. 63/376,227, filed Sep. 19, 2022.

FIELD

This disclosure relates to systems and methods involving micromobility (e.g., the use of relatively small personal vehicles such as bicycles, e-bikes, electric scooters, electric skateboards, and/or the like) and to systems and methods for obtaining and providing information about a cyclist's (or other suitable micromobility user's) surroundings.

INTRODUCTION

Situational awareness is important for a cyclist riding a bicycle, particularly when riding in areas also used by motor vehicles, other cyclists, pedestrians, and/or the like. Without an awareness of other objects or people in their vicinity, a cyclist risks experiencing a collision or needing to take dangerous evasive action to avoid a collision. However, it is challenging for a cyclist to maintain adequate awareness of objects and events behind them. When a cyclist looks over their shoulder to see what is behind them, they cannot see what is ahead of them and they risk losing stability or inadvertently changing their bicycle's course. It is also difficult for the cyclist to turn their head far enough to see what is directly behind them, rather than off to the side. Additionally, even if a cyclist does get a glimpse of a vehicle approaching from behind, it is often difficult to determine how near the vehicle is or how soon it will intercept the cyclist. Existing solutions, such as bicycle radar devices, cannot discriminate between various types of objects (e.g., cars, motorcycles, other cyclists) and are ineffective in determining relative priority of threats in common multi-target situations found in urban and suburban environments (e.g., cars in an immediately adjacent lane vs. cars two lanes away). Monocular camera-based solutions can identify multiple target threats and azimuthal location, but provide poor accuracy when assessing relative distance and speed of threats. Better solutions are needed for providing situational awareness to cyclists.

SUMMARY

The present disclosure provides systems, apparatuses, and methods relating to situational awareness for cyclists.

In some examples, a computer-implemented method for improving micromobility vehicle travel comprises: collecting, from a plurality of computing devices each traveling with a respective micromobility vehicle in a same geographic area, data reflecting hazardous conditions encountered by the corresponding micromobility vehicle at respective locations; determining, based on the collected data, respective hazard levels of each of the locations; and generating, based on the determined hazard levels, a map of at least a portion of the geographic area, wherein the map includes hazard information based on the determined hazard levels of the locations.

In some examples, a computer-implemented method for improved micromobility vehicle travel comprises: receiving, at a processor, a plurality of sets of user data each captured by a user device borne by a respective one of a plurality of micromobility vehicles, wherein each set of user data includes location-specific information about travel conditions encountered by the corresponding micromobility vehicle; receiving, at the processor, input indicating a start point and an end point; identifying one or more routes between the start point and the end point; and generating a map including the start point, the end point, the one or more routes between the start point and the end point, and a visual indication of risk level based on the travel conditions at one or more portions of at least one of the one or more routes.

In some examples, a data-processing system comprises: one or more processors; a memory; a plurality of instructions stored in the memory, wherein the plurality of instructions is executable by the one or more processors to: receive a plurality of sets of user data each including location-specific information about travel conditions encountered by a respective micromobility vehicle; identify one or more routes between a same start point and a same end point; and generate a map including the start point, the end point, the one or more routes between the start point and the end point, and a visual indication of risk level based on the travel conditions at one or more portions of at least one of the one or more routes.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 23 is a flow chart depicting steps of an illustrative method for providing situational awareness for a user of a micromobility vehicle in accordance with aspects of the present disclosure.

DETAILED DESCRIPTION

Figure 1:
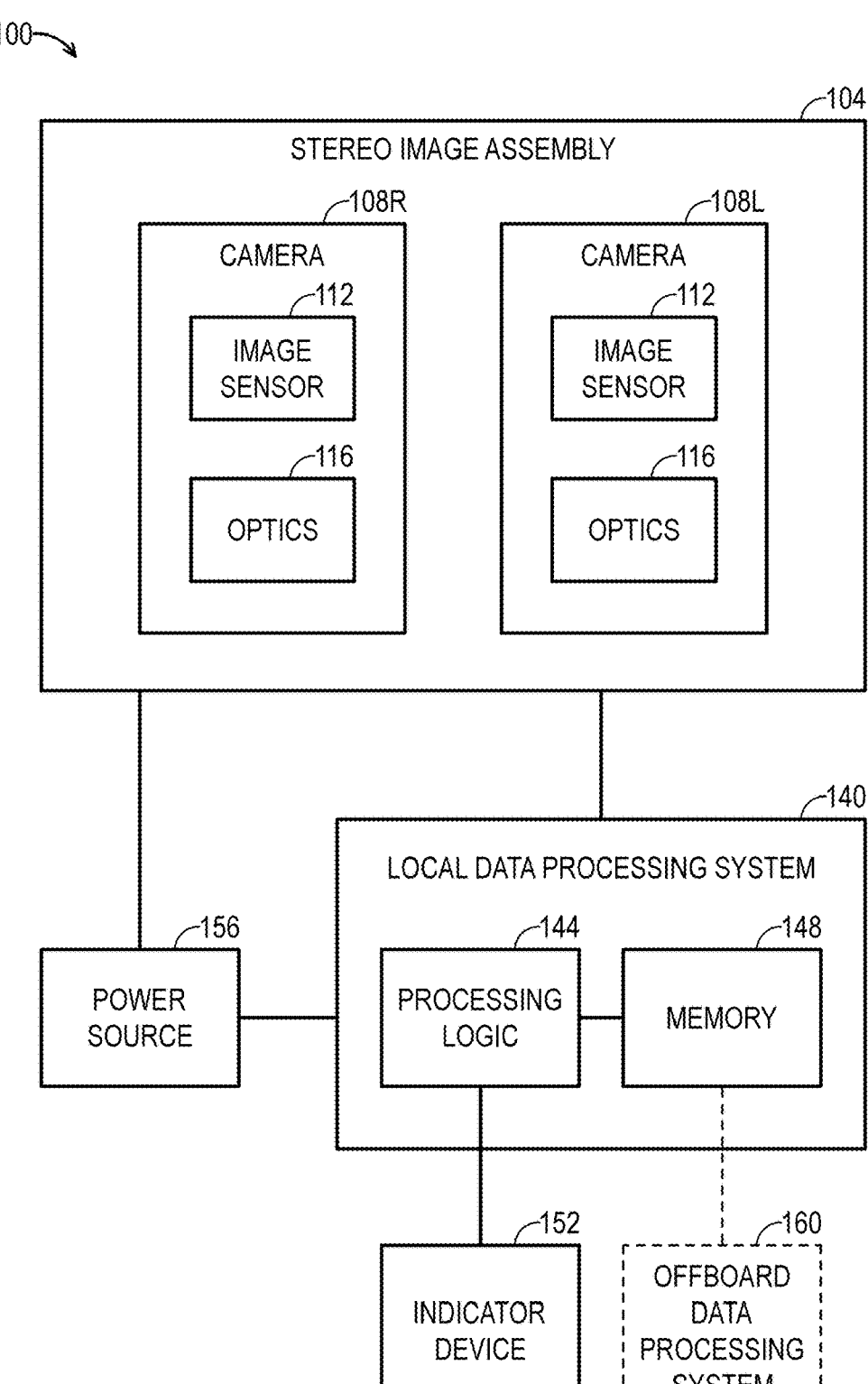
FIG. 1 is a schematic diagram of an illustrative situational awareness system in accordance with aspects of the present disclosure.

Various aspects and examples of systems and methods related to micromobility, including situational awareness, are described below and illustrated in the associated drawings. Unless otherwise specified, a system or method in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

The terms "inboard," "outboard," "forward," "rearward," and the like are intended to be understood in the context of a host vehicle (e.g., a bicycle) on which devices described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "rearward" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

"Processing logic" describes any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction. In some examples described herein, directional axes (e.g., X, Y, and Z axes) are depicted in the drawings and referred to in the associated description.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Computer Implementation

Aspects of digital platforms, situational awareness systems, and/or other suitable systems and/or devices in accordance with aspects of the present disclosure may be embodied as a computer method, computer system, or computer program product. Accordingly, aspects of a system or device described herein may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the system or device may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of a digital platform may be written in one or any combination of programming languages, including an object-oriented programming language (such as Java, C++, or Python), conventional procedural programming languages (such as C), and functional programming languages (such as Haskell). Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider) or wireless communication (e.g., Wi-Fi, Bluetooth, cellular data communication, and/or any other suitable form(s) of wireless communication).

Aspects of systems and/or devices may be described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be programmed into or otherwise provided to processing logic (e.g., a processor of a general purpose computer, special purpose computer, field programmable gate array (FPGA), or other programmable data processing apparatus) to produce a machine, such that the (e.g., machine-readable) instructions, which execute via the processing logic, create means for implementing the functions/acts specified in the flowchart and/or block diagram block(s).

Additionally or alternatively, these computer program instructions may be stored in a computer-readable medium that can direct processing logic and/or any other suitable device to function in a particular manner, such that the instructions stored in the computer-readable medium produce an article of manufacture including instructions which implement the function/act specified in the flowchart and/or block diagram block(s).

The computer program instructions can also be loaded onto processing logic and/or any other suitable device to cause a series of operational steps to be performed on the device to produce a computer-implemented process such that the executed instructions provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the platform. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

General Overview

The present disclosure describes systems and methods related to situational awareness for cyclists or other suitable micromobility users, and to micromobility in general. Systems and methods of the present teachings generally facilitate an improved micromobility experience and/or encourage micromobility use.

Overviews of example situational awareness systems and digital micromobility platforms are described in the Examples, Components, and Alternatives section below. In general, aspects of the present teachings may be combined with one another in any suitable manner. For example, a situational awareness system as described herein may be used to collect data that is communicated to and used by a micromobility platform as described herein.

Examples, Components, and Alternatives

The following sections describe selected aspects of illustrative micromobility-related systems and/or methods. The examples in these sections are intended for illustration and should not be interpreted as limiting the scope of the present disclosure.

Each section may include one or more distinct embodiments or examples, and/or contextual or related information, function, and/or structure.

A. Overview of Situational Awareness Systems

In general, a situational awareness system in accordance with aspects of the present teachings may include two or more cameras in a stereo configuration positioned to acquire stereo image data of a scene behind a cyclist, and a processor configured to determine, based on the acquired stereo image data, relative position information relating to one or more object(s) in the scene.

Relative position information can be used to assist the cyclist in a variety of ways in accordance with aspects of the present teachings. In some examples, the processor is configured to determine respective distances and azimuthal positions between the cyclist and one or more objects in the scene and to cause a display or other human-perceptible indicator to provide information about those objects to the cyclist. Based on the position information (and/or a rate of change of position information over time), the processor may be configured to determine an object's radial distance, azimuthal position, speed relative to the cyclist, trajectory, and/or time to intercept the cyclist.

For example, the processor may determine that an object such as a car will pass close to the cyclist, or is closing at a very high velocity, and cause the indicator to issue an urgent warning. The cyclist may use this information, e.g., to identify a good opportunity to execute a lane change or other evasive maneuver. As another example, the processor may determine that a car is somewhere behind the cyclist but unlikely to intercept the cyclist's path, and provide this information to the cyclist in a less urgent way.

The data generated by the device may be recorded to generate a history of events along a given route for subsequent review and analysis. When combined with other sensing modalities, such as GPS, a geotagged map of events can be produced for such purposes as urban planning, micromobility route evaluation, cycling race analysis, etc.

In some examples, scene depth information determined based on the acquired stereo images may be used instead of or in addition to position data for training and/or assessment purposes for one or more cyclists. For example, the scene captured by the cyclist may include one or more other cyclists who are trailing the cyclist who has the camera. The acquired scene depth information may be used to assess the riding posture of the other cyclist(s), drafting aero position or other team cycling techniques of the other cyclist(s), fit between one or more of the cyclist(s) and their bicycle geometry (e.g., position and angle of torso, head, arms, legs, etc. relative to seatpost and/or handlebar height), and/or any other suitable information in a real-world riding environment. Dynamic analysis of this information in conjunction with performance metrics provided by other common cycling tools such as power meters, cadence sensors, speed sensors, heart rate monitors, etc. over the course of an outdoor ride can be studied offline to assess opportunities for improvement. The information provided by coupled analysis of ergonomics and performance is conventionally only available using stationary tools such as would be found in a bike fitter's lab or bike shop.

Relative position information may be determined based on the acquired stereo image data in any manner suitable for the example in question. For example, in cases where the relative position information is used for situational awareness (e.g., to provide warnings of approaching cars and/or other potential threats), it is generally desirable to determine the relative position information in real time or near real time. Accordingly, the relative position information may be computed by an onboard processor carried by the cyclist, which may be integrated into a same device as the stereo camera assembly, and may be computed using method(s) performable by the onboard processor in real time or near real time. Example methods are disclosed herein.

On the other hand, in examples where the relative position information is used for cyclist biomechanical analysis, for example, it may be unimportant or unhelpful to determine the relative position information in real time. Accordingly, the relative position information may be determined using offline processing (e.g., on the device itself in offline mode or on an offboard device such as a personal computer, smartphone, and/or remote server to which the acquired stereo images are uploaded). This may allow the scene depth information to be determined using more computationally intensive techniques than could feasibly be performed in near-real time on a computer small enough to carry along on the bicycle ride. This may allow for scene depth information to be generated in relatively fine detail (e.g., a high resolution of depth information, such as a pixelwise depth map). In some examples, analysis by the offboard computer is provided in a software-as-a-service (SaaS) model. The system may include a smartphone application, cycling computer interface, and/or web browser configured to allow the user to interface with the offboard computer and/or with the onboard computer (e.g., to adjust user settings at the onboard computer).

In some examples, one or more objects appearing in the stereo images are identified by an onboard or offboard computer as being a car, pedestrian, cyclist, truck, dog, etc. The identified type of object may be communicated to the user (e.g., along with the relative position information). The object type may be used by the computer to assess a threat level of a detected object and to incorporate the threat level into the information displayed and/or otherwise communicated to the user. For example, when riding on roads shared with motor vehicles an object identified as being a motor vehicle may be evaluated to be a greater threat than an object identified as being another cyclist, and the system may respond to an object identified as a motor vehicle (e.g., and determined to be within a certain distance of the cyclist) by producing a more urgent warning than another cyclist may warrant. A vehicle approaching at a greater speed or anticipated to pass at a closer distance to the rider may also produce a more urgent warning. As another example, an aggressive dog chasing a cyclist may be highlighted as an urgent threat. In other situations, such as a cycling race, threats may be defined in terms of competitive threats and more urgent warnings may be associated with other cyclists. Objects that are unlikely to create a threat may or may not be announced; for example, unlikely threats may not be announced in the case where they would create a distraction or desensitization of the user from a more urgent threat.

As used herein, the term "bicycle" includes human-pedal-powered bicycles as well as bicycles powered by electricity (AKA e-bikes). It is further noted that examples of situational awareness systems described herein are suitable for use in contexts other than cycling. For example, a situational awareness device in accordance with aspects of the present teachings may be suitable for use with a different type of human-powered or non-human powered vehicle (e.g., a tricycle, moped, motorcycle, wheelchair, skateboard, electric skateboard, scooter, hoverboard, snowmobile, go-kart, car, and/or any other suitable vehicle).

With respect to the present disclosure, one or more machine learning (ML) models may be trained and used to determine output data defining bounding boxes (e.g., position, width, and height) that bound one or more objects of interest in an acquired image. Training data for one or more of the models may include any suitable image data, including, e.g., one or more open-source datasets (e.g., the ImageNet dataset and/or similar datasets), images submitted by users of the situational awareness system (e.g., images uploaded by users of a SaaS platform of the situational awareness system), and/or any other suitable data for training the one or more ML models to generate bounding boxes for objects of likely interest (e.g., cars, trucks, buses, motorcycles, pedestrians, animals, bicycles, and/or other objects reasonably expected to appear in the view of a camera carried by a cyclist). Suitable ML models may include, e.g., deep neural networks (DNNs).

B. Illustrative System

Figure 2:
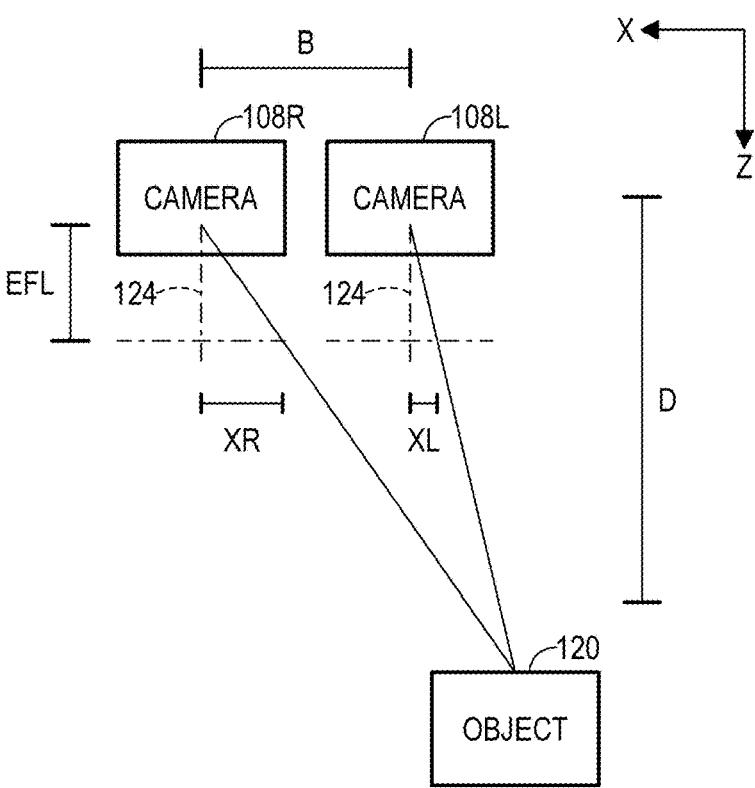
FIG. 2 is a schematic diagram of an illustrative stereo image assembly in accordance with aspects of the present disclosure.
Figure 3:
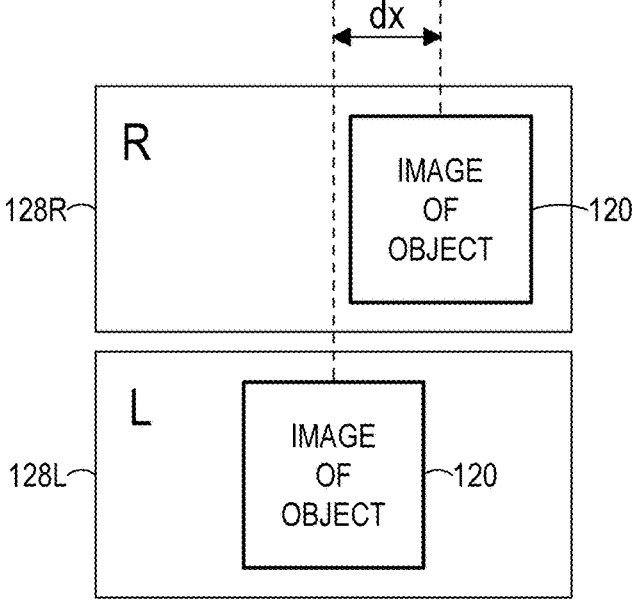
FIG. 3 is a schematic diagram of a pair of stereo images in accordance with aspects of the present disclosure.

With reference to FIGS. 1-3, this section describes an illustrative system 100 for facilitating cyclist situational awareness. System 100 is an example of the situational awareness system described above.

System 100 includes a stereo image assembly 104 configured to acquire stereo images. In the depicted example, stereo image assembly 104 includes two cameras 108L, 108R disposed in a stereo configuration. In the example described herein, cameras 108L, 108R are mounted in a horizontal configuration, such that the two cameras are configured to be at a same height (e.g., relative to the ground, such that a baseline between the cameras is parallel to the ground) during normal use. From the perspective of assembly 104, camera 108L is on the left and camera 108R is on the right. However, in general the two cameras may be oriented in any other suitable configuration. For example, the two cameras may be oriented in a vertical configuration, such that one camera is disposed directly above the other during normal use (e.g., with a baseline between the cameras oriented orthogonal to the ground), or the two cameras may be oriented in a diagonal configuration during normal use (e.g., with a baseline between the cameras oriented at a nonorthogonal angle to the ground). In some examples, a given device including a stereo image assembly is suitable for acquiring images in several or any orientation.

In some examples, the stereo image assembly includes more than two cameras, and certain example methods and calculations described herein may be adjusted accordingly.

Each camera 108L, 108R includes a respective image sensor 112 (e.g., a CCD array, CMOS array, and/or any other suitable image sensor) and a respective optics assembly 116 configured to focus and/or otherwise adjust and/or direct light to the associated image sensor to facilitate image sensing. In the depicted example, effective focal lengths (EFLs) of each camera 108L, 108R are approximately equal (e.g., within standard manufacturing tolerances or similar).

In general, any configuration of optical elements and image-sensing elements suitable for acquiring stereo images may be used. For example, in some cases image sensors 112 may comprise two portions of a same image sensing array.

FIG. 2 schematically depicts an illustrative geometry of stereo assembly 104, in accordance with aspects of the present teachings. This description of FIG. 2 makes reference to directions defined by the X and Z axes depicted in FIG. 2. As shown in FIG. 2, cameras 108L, 108R are disposed along approximately the same position in the Z direction (e.g., within standard manufacturing tolerances or similar), such that an object 120 is separated from each camera by a same distance D in the Z direction. Put another way, the difference in position in the Z direction between a point on object 120 and camera 108L is D, and the difference in position in the Z direction between the same point on object 120 and camera 108R is also D.

In the X direction, cameras 108L, 108R are separated from each other by a baseline distance B (AKA the stereo baseline). In the depicted example, cameras 108L, 108R are oriented such that optical axes 124 of the cameras are parallel to each other. In some examples, the optical axes of the cameras are nonparallel and the calculations described below are adjusted accordingly. In the illustrative situation depicted in FIG. 2, cameras 108L, 108R each acquire image data of a scene including object 120. Because cameras 108L, 108R are spaced from each other by baseline B, the cameras "see" a point on object 120 (and therefore object 120 itself) as being in different spatial positions in the X direction. As shown in FIG. 2, the projection of a point on object 120 at an image acquired by camera 108R is at a different X-coordinate in that image than is a projection of the same point at an image acquired by camera 108L. The projection of the point at the image acquired by camera 108R is disposed at a distance XR from the principal axis of camera 108R in the X direction, and the projection of the point at the image acquired by camera 108L is disposed at a distance XL from the principal axis of camera 108L in the X direction. Distance XL is in general unequal to distance XR. Accordingly, the point (and thus object 120) appears to be at different positions in the X direction in the two images.

FIG. 3 depicts illustrative image 128R acquired by camera 108R and illustrative image 128L acquired by camera 108L. The portion of the acquired image corresponding to object 120 appears to be disposed at different lateral positions in the two images 128R, 128L, due to the stereo geometry described above with reference to FIG. 2. The difference in lateral position (AKA disparity) is labeled dx in FIG. 3 and its value is, at least to good approximation, proportional to the multiplicative product of the effective focal length of optical assemblies 116 and baseline distance B divided by distance D. That is, $dx \approx EFL \times B/D$. When appropriate intrinsic and extrinsic camera calibration and stereo rectification are applied to the images, the value of dx may be represented as simply proportional to D. Accordingly, the distance D is proportional to the multiplicative product of the effective focal length and the baseline distance divided by the difference in lateral position. That is, $D \approx EFL \times B/dx$. Based on this relationship, it is possible to determine the distance D based on certain known stereo assembly properties (namely, EFL, B, and pixel pitch) and a comparison between the images acquired by cameras 108L, 108R (i.e., disparity dx).

The geometry of FIG. 2 is an example of a stereo assembly geometry suitable for use in a situational awareness system; in general, any geometry suitable for acquiring stereo image data may be used. It is understood to those skilled in the art that appropriate camera calibration and rectification methods are to be used when appropriate to account for assembly error and lens distortion prior to stereo distance calculation. For example, in some cases the cameras of the assembly do not all have the same effective focal length or may not be accurately modeled as simple pinhole camera models (e.g. fisheye lenses) and the mathematical relationship described above for determining distance based on image displacement over the field of view is adjusted to compensate. FIG. 2 is a schematic diagram intended for illustrative purposes and not intended to necessarily depict any distances or sizes to scale.

Returning to FIG. 1, system 100 further includes a local data processing system 140 coupled to stereo image assembly 104. Local data processing system 140 includes processing logic 144 in communication with memory 148. Local data processing system 140 is suitable for being brought along on a cyclist's ride (e.g., mounted on a bicycle, helmet, clothing, cyclist's body, bicycle seat, seat post, etc.). In some examples, local data processing system 140 and stereo image assembly 104 are integrated into a same housing.

Processing logic 144 is configured to control cameras 108L, 108R, and optionally any other suitable portion of stereo assembly 104, to acquire stereo image data and store acquired data in memory 148. For example, processing logic 144 may be configured to control cameras 108L, 108R to acquire data in a synchronized manner. If the two cameras acquire images at different times, object 120 may move so much between acquisition by the first camera and acquisition by the second camera that it is not possible to determine distance D (or other relevant information) with adequate accuracy. Accordingly, controlling the cameras in a synchronized manner may include triggering the cameras to acquire image data at a same time within sufficient tolerance (e.g., within a sufficiently small window of time) that the object(s) for which distance information is unlikely to have moved enough to make the determination of the distance information unreliable. The tolerance and/or window of time may be selected based on information such as expected speed(s) of objects likely to be imaged (e.g., cars moving on a road behind a cyclist), one or more properties of methods being used to determine depth based on the acquired images, and/or on any other suitable information.

In some examples, local data processing system 140 is configured to determine relative position information (e.g., a distance between cameras 108L, 108R and object 120). For example, the local data processing system may be configured to determine the image disparity dx based on respective images acquired by cameras 108L, 108R, and to determine distance D based on the mathematical relationship between D and dx. The object angular location (e.g., an angular position of the object relative to the camera assembly) may be acquired based on the object's position relative to the camera optical axis. The angular position may be combined with distance D to form a vector position of the object relative to the camera assembly. Example methods for determining the relative position information based on acquired images are described elsewhere herein.

Relative position information determined by local data processing system 140 may be received at one or more indicator devices 152 configured to provide human-perceptible indicator(s) to a cyclist using system 100. Suitable human-perceptible indicator(s) may include a visual display such as a text-based (e.g., alphanumeric) notification, a warning light, a camera image, a pictorial and/or graphical image; an audible alert such as pre-recorded or AI generated natural language (e.g. "Car back, 2 vehicles, 3 seconds to intercept" and/or any other suitable message); beeps, buzzes, tones, and/or any other suitable sounds; and/or any other suitable way of apprising the cyclist of their situation based on the obtained information. In some examples, the indicator generates a sound and the sound indicates a predicted threat level of the object. For example, different tones may indicate different threat levels or types of threat or types object; a louder and/or sharper sound may indicate a greater threat; a pitch of the sound may indicate a level of the threat (e.g., a higher pitch indicating a higher threat level, and/or any other suitable indication), and/or any other suitable property of the sound may be used to indicate threat level in any other suitable manner.

In some examples, objects below a certain threshold threat level are not audibly announced, such that the user can maintain their focus on threats above this threshold. Accordingly, in some examples, the indicator generates a sound only in response to a detected threat level that meets or exceeds a threshold threat level. The threshold threat level may be selected by a user and/or preprogrammed into the device.

In some examples including audible notification(s), the audible notification may emanate from an indicator device 152 embedded within the same housing as the data processing system 140. Indicator device 152 may comprise any suitable device configured to produce and/or emit an audio notification, such as, without limitation, a speaker, a buzzer, a horn, or a bell.

In some examples, indicator device 152 is a digital device, such as a mobile phone or tablet; alternatively, or additionally, indicator device 152 may comprise one or more analog devices, such as a bike bell.

In some examples, in addition to or instead of producing audio notification(s), indicator device 152 is configured to visually display indication(s) and/or other data. In some examples, indicator device 152 comprises a display device configured to display visual information based on the determined distance information. The display device may be, e.g., a dedicated display of system 100, a display of a smartphone, a display of a cycling computer, a heads-up display, smartglasses, and/or any other suitable device.

In some examples, the indicator device is manufactured and/or sold as part of system 100; alternatively, or additionally, the indicator device may be an existing (e.g., third-party) device, such as a smartphone or bike computer already owned by the cyclist.

System 100 further includes a power source 156 configured to provide power to stereo image assembly 104, local data processing system 104, and/or any other suitable device(s). Power source 156 may include one or more batteries (e.g., rechargeable and/or disposable batteries), a solar power device, and/or any other suitable device(s). Power source 156 may be embedded in the same housing as data processing system 140, stereo image assembly 104, or both. In some examples, power source 156 is an external accessory battery pack, the battery of a smartphone, cycling computer, or other suitable device configured to be coupled to and/or part of system 100 (e.g., the battery of an e-Bike or e-Scooter). In some examples, power source 156, indicator device 152, and/or local data processing system 140 are all part of a user's smartphone, cycling computer, or other suitable device.

Devices and/or assemblies that are examples of system 100 may be deployed in several different configurations. In some examples, the system is deployed with stereo image assembly 104 aimed backward to image a scene behind the cyclist. Put another way, the stereo image assembly may acquire rearview images. This allows the system to improve situational awareness for the cyclist by obtaining relative position information related to objects behind the cyclist, such as motor vehicles that are approaching and may be at risk of colliding with the cyclist or causing the cyclist to need to take evasive action. Example methods for obtaining situational awareness information based on the acquired images and for providing related information to a cyclist are described elsewhere herein. To facilitate situational awareness by acquiring rearview images, the stereo image assembly may be mounted to the cyclist's helmet, bicycle seatpost, bicycle seat, cargo rack, and/or any other suitable location on the bicycle, the cyclist, and/or the cyclist's clothing or accessories.

In some examples, a stereo image assembly positioned to acquire rearview images may be used to acquire information about cyclist(s) riding behind the cyclist wearing or carrying the stereo image assembly. For example, a stereo image assembly mounted on a lead cyclist's bicycle, helmet, seat assembly, and/or body may be used to acquire images and corresponding relative position information about a trailing cyclist riding behind the leading cyclist. Alternatively, or additionally, a stereo image assembly may be mounted on the trailing cyclist (and/or the trailing cyclist's helmet, bicycle, etc.) and aimed forward to acquire images of the lead cyclist. Images of the lead or trailing cyclist, and/or relative position and/or scene depth information determined based on the images, may be used for training purposes (e.g., to help a cyclist assess and improve their cycling technique, to help cyclists assess and improve their methods of riding in a peloton, and/or any other suitable training purpose), to determine a cause of an accident, to assess whether a rule has been violated (e.g., in a cycling race), and/or for any other suitable reason(s). The position and/or orientation in which the stereo image assembly is mounted may be selected based on the intended purpose. For example, depending on the purpose it may be useful to have images acquired by a stereo image assembly mounted on a helmet, mounted on a bicycle seat, tilted downward, tilted upward, angled generally parallel to the ground, or disposed in any other manner suitable for the purpose.

In some examples, a stereo image assembly may be positioned on a cyclist's body, clothing, and/or bicycle in such a way that the assembly can acquire images of that cyclist. For example, the stereo image assembly may be disposed on or adjacent handlebars of the bicycle facing backward, such that the cyclist is within the field of view. The acquired images, and/or scene depth information determined based on the images, may be used for training purposes and/or any other suitable purpose(s) as described above.

In some examples, a stereo image assembly is positioned in a forward-facing manner so as to capture image data of a scene in front of the cyclist, rather than behind the cyclist. For example, the assembly may be disposed on the cyclist's helmet and facing forward, disposed on the bicycle handlebar and facing forward, and/or disposed in any other suitable position.

In some cases, examples of system 100 may be located on or within a car or other motor vehicle, with the stereo image assembly positioned to acquire images of a cyclist riding near the car. The images, and/or scene depth information determined based on the images, may be used for training purposes as described above and/or any other suitable purpose(s). In such an example, the local data processing system may be larger in size than would be possible for a bike-mounted deployment, and/or the local data processing system may be supplemented by and/or replaced by an offline analysis or an offboard system, as described next.

Optionally, data acquired by system 100 may be communicated to an offboard data processing system 160, which may comprise a personal computer (e.g., desktop or laptop computer), server, smartphone, and/or any other suitable system. In at least some cases, offboard system 160 may have greater computing power than local data processing system 140, which may be constrained in size (e.g., weight, volume, width, etc.) and/or in power consumption to facilitate being brought along on the bicycle ride. This may facilitate determination of scene depth information and/or other analysis using techniques that are more demanding with respect to processing capability, power, and/or memory. Data may be communicated from local system 140 to offboard system 160 by a wired connection, wirelessly, by transfer of removable storage media, and/or in any other suitable manner.

For example, a cyclist may upload data from local system 140 to the offboard data processing system after returning from a ride, and use the analysis performed by the offboard system to, e.g., review aspects of their ride. This may be particularly useful in training applications and/or any other applications in which it may be desirable to use the acquired image data to determine detailed scene depth information (e.g., a pixelwise depth map), which may exceed the computational ability of at least some examples of local data processing system 140. In some examples, access to an offboard data processing system configured to analyze stereo image data as described herein is provided in a software-as-a-service model.

In some examples, local system 140 includes a communication module configured to upload data (e.g., via a Wi-Fi network, cellular data network, and/or any other suitable communication) to offboard system 160 while the cyclist is out on a ride. In these examples, the offboard system may be located remote from the cyclist (e.g., a remote server), located in a car or other suitable vehicle in the vicinity of the cyclist, and/or in any other suitable location. The upload may occur in real time, near real time, at predetermined or ad hoc intervals, on demand, and/or in any other suitable manner.

C. Second Illustrative System

Figure 4:
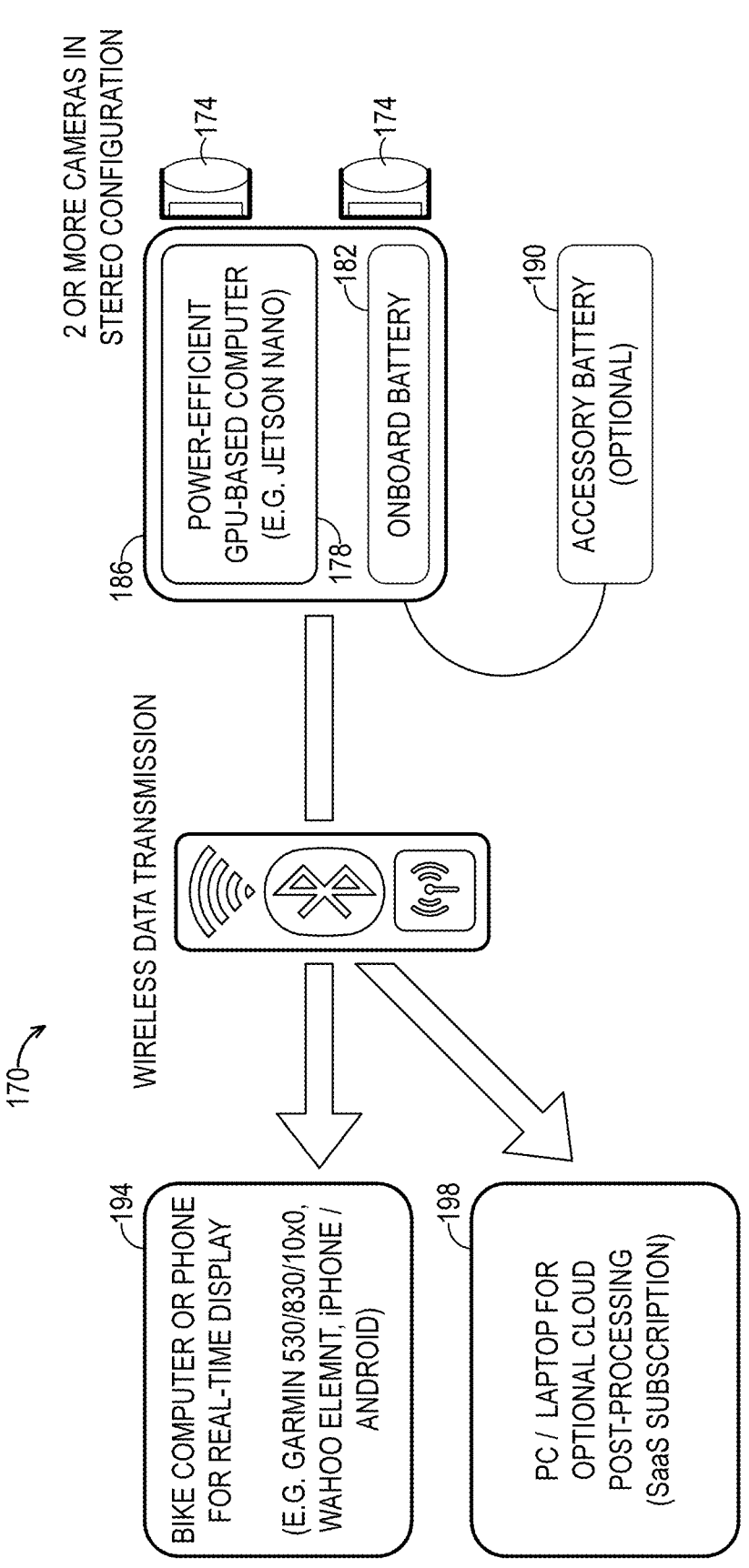
FIG. 4 is a schematic diagram of another illustrative situational awareness system in accordance with aspects of the present disclosure.

With reference to FIG. 4, this section describes system 170, which is another example of an illustrative situational awareness system for cyclists.

As shown in FIG. 4, system 170 includes two or more cameras 174 disposed in a stereo configuration. The cameras are in communication with a computer 178 configured to receive stereo image data captured by the cameras and determine, based on the received data, relative position information (e.g., distance between the cameras and object(s) such as an approaching vehicle). In the depicted example, computer 178 comprises a small, power-efficient GPU and CPU based computing device. An example of a suitable device is the Jetson Nano computer by NVIDIA corporation, but other devices capable of computer vision and machine learning or AI processing are suitable.

In the depicted example, cameras 174 and computer 178 are powered by at least one onboard battery 182. Cameras 174, computer 178, and battery 182 are included in a common housing 186. Optionally, an external battery 190 may be coupled to cameras 174 and/or computer 178 to provide additional power. External battery 190 is not included in housing 186. Battery 190 therefore may be larger in size and/or weight than onboard battery 182 and therefore may have a larger power capacity than battery 182.

In some examples, battery 190 may serve as a backup source of power in case battery 182 runs out of power or is in danger of running out of power. For example, a cyclist may carry battery 190 in a pocket and/or bike bag where battery 190 is not coupled to the cameras and computer, and may couple battery 190 to the cameras and computer in response to noticing that onboard battery 182 is low on power. In some examples, the cyclist may continue their ride with external battery 190 coupled to the cameras and computer (e.g., via a power cable). In some examples, the cyclist may temporarily couple external battery 190 to onboard battery 182 to at least partially recharge the onboard battery, and decouple the external battery from the onboard battery to resume their ride the batteries disconnected from each other.

System 170 further includes a mobile digital device 194 in wireless communication (e.g., Wi-Fi, Bluetooth, cellular data communication, and/or any other suitable form(s) of wireless communication) with computer 178. Device 194 includes a visual display (e.g., a smartphone screen) and is configured to display information and/or other suitable indicator(s) at the visual display in real time or near real time. In the depicted example, device 194 is not included in housing 186, and may be spaced from the housing in use. For example, the housing may be mounted to a helmet worn by the cyclist and device 194 may be mounted to the bicycle's handlebars, disposed in a pocket of the cyclist's jersey, and/or disposed in any other suitable location. In other examples, however, a mobile digital device may be disposed in the housing that includes the cameras and onboard computer, fastened to the housing, mounted in a mount that is attached to or integrated into the housing, and/or disposed in any other suitable configuration relative to the housing.

Device 194 may comprise a bike computer, a smart phone, and/or any other suitable device(s). Examples of suitable mobile digital devices include, without limitation, the Edge® 530 bike computer by Garmin Ltd., the Edge® 830 bike computer by Garmin Ltd., the Edge® 1030 bike computer by Garmin Ltd., the Edge® 1040 bike computer by Garmin Ltd., the Elemnt Roam bike computer by Wahoo Fitness, and the Elemnt Bolt bike computer by Wahoo Fitness.

Optionally, system 170 further includes a remote computer 198, which may be a desktop personal computer, a laptop computer, a server and/or cloud computing system, a smartphone, and/or any other suitable data processing device(s). Remote computer 198 is configured to receive data uploaded by onboard computer 178 (e.g., in real time during the ride, in response to user input received at the onboard computer and/or at the remote computer during or after the ride, at predetermined intervals during or after the ride, and/or in any other suitable manner). Remote computer 198 can be much larger in size and/or weight than the onboard computer and therefore may have greater processing power and/or memory. Accordingly, the remote computer may be capable of analyzing stereo image data and/or other suitable data in ways (e.g., using more computationally intensive techniques) that the onboard computer cannot do, or cannot do in a suitable time frame.

In some examples, onboard computer 178 is configured to determine distance(s) between the cameras and object(s) in the general vicinity of the cyclist based on the captured stereo images using computational techniques that can be performed relatively quickly by onboard computer 178, and remote computer 198 is configured to determine suitable information using, in some cases, computational techniques that could not be performed as quickly by the onboard computer.

For example, remote computer 198 may be configured to determine a depth map indicating a distance between the cameras and each of hundreds or thousands of points on an object, whereas onboard computer 178 may be configured to determine a single number or vector position characterizing the distance and/or relative position between the cameras and that object. Calculating a single distance or vector position may be achievable by the onboard computer in a practical window of time, whereas computing a depth map may not be.

The duration of a practical window of time may depend on the purpose or context of the calculation. For example, if the onboard computer would take so much time to compute a scene depth map for a given object based on a given set of stereo images that the depth map is no longer accurate by the time the depth map is computed (e.g., because the object and/or bicycle have moved appreciably relative to each other in the time it took to compute the depth map), then the onboard computer may be said to be unable to compute the depth map in a practical window of time. On the other hand, the onboard computer may be able to compute a single number characterizing the relative position of the object based on a given set of stereo images sufficiently quickly that the object and bicycle do not move appreciably relative to each other in the time it takes to compute the position. Put another way, the onboard computer may be able to compute the relative position (and, in at least some cases, cause the position or an associated indicator to be displayed to the cyclist) within a very short window of time after the capture of that set of images. Accordingly, the onboard computer may be said to be able to determine the relative position in a practical window of time. In some examples, a practical window of time may be less than one second, less than half a second, less than a tenth of a second, and/or any other suitable window.

The cameras of the stereo image assembly may have any frame rate suitable for the use of the system in a given context. In examples in which the system is used to provide information in real time or near real time (e.g., for providing traffic-related information), a frame rate in the range of 5 to 120 frames per second (inclusive) may be desirable. In some examples, a frame rate of 10 frames per second may be desirable. In examples wherein it is feasible to obtain images less frequently than real time, a lower frame rate may be acceptable.

In some examples, access to feature(s) of remote computer 198, such as computations of scene depth maps, may be provided to a user on a subscription basis in a software-as-a-service (SaaS) model. For example, a user may use onboard computer 178 to provide situational awareness (e.g., to warn the cyclist of approaching vehicles or other cyclists) in real time while out on a bicycle ride, but may use remote computer 198 to provide depth maps of an object(s) or scene behind the cyclist. These depth maps may provide the cyclist with more insight about the conditions in which they were riding. This may be particularly useful if the cyclist was riding with other cyclist(s) (e.g., in a race peloton or group ride) and the remote computer computes depth map(s) of the other cyclist(s).

Example methods for example computations suitable for performing by an onboard computer and a remote computer respectively are provided elsewhere herein.

D. Illustrative Helmet-Mounted Situational Awareness Device

With reference to FIGS. 5-10, this section describes illustrative helmet-mountable situational awareness devices 208 and 254, which are examples of devices suitable for use in situational awareness systems as described above. In this section, these example helmet-mountable devices are described in the example context of being mounted to a helmet worn by a person riding a bicycle. In other examples, however, device 208, device 254, and any other suitable helmet-mountable device in accordance with aspects of the present teachings can be mounted to a helmet worn by a person using another type of vehicle, such as a skateboard, electric skateboard, snowboard, scooter, electric scooter, motorcycle, moped, and/or any other suitable vehicle; by a person using roller skates, rollerblades, ice skates, skis, and/or any other suitable device; or generally by a person in any other suitable context in which situational awareness and/or relative position information is desirable. Features of a helmet-mountable device configured to facilitate attachment of the device to a helmet may in some cases differ from those of devices 208, 254 based on the type of helmet and/or intended use case.

Figure 5:
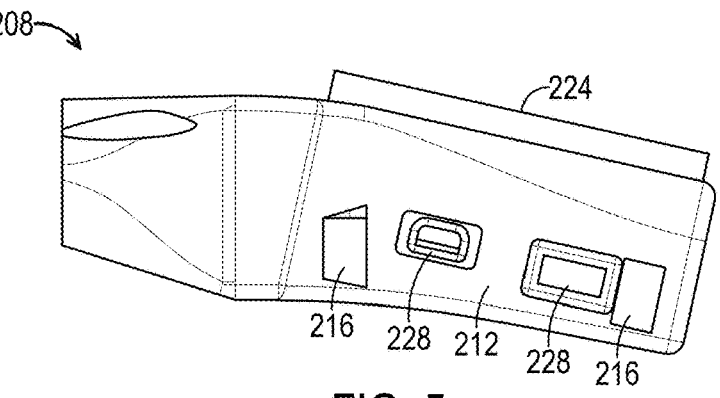
FIG. 5. is a side view of an illustrative helmet-mountable situational awareness device in accordance with aspects of the present disclosure.
Figure 6:
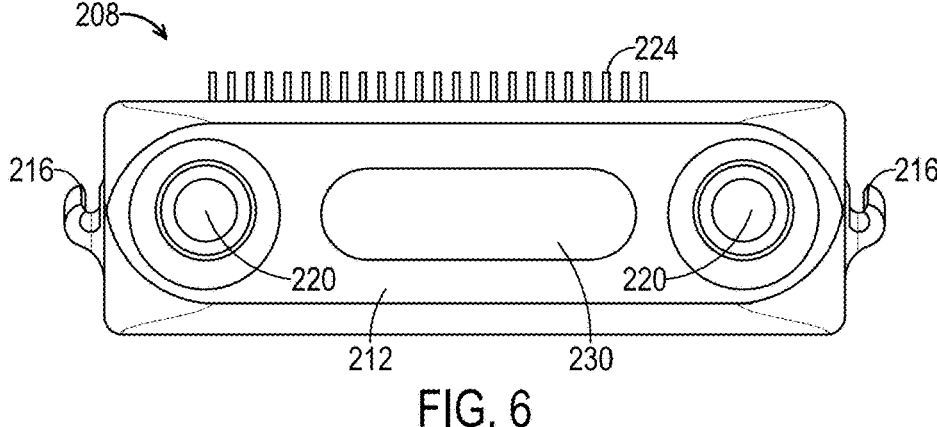
FIG. 6 is a front view of the device of FIG. 5.
Figure 7:
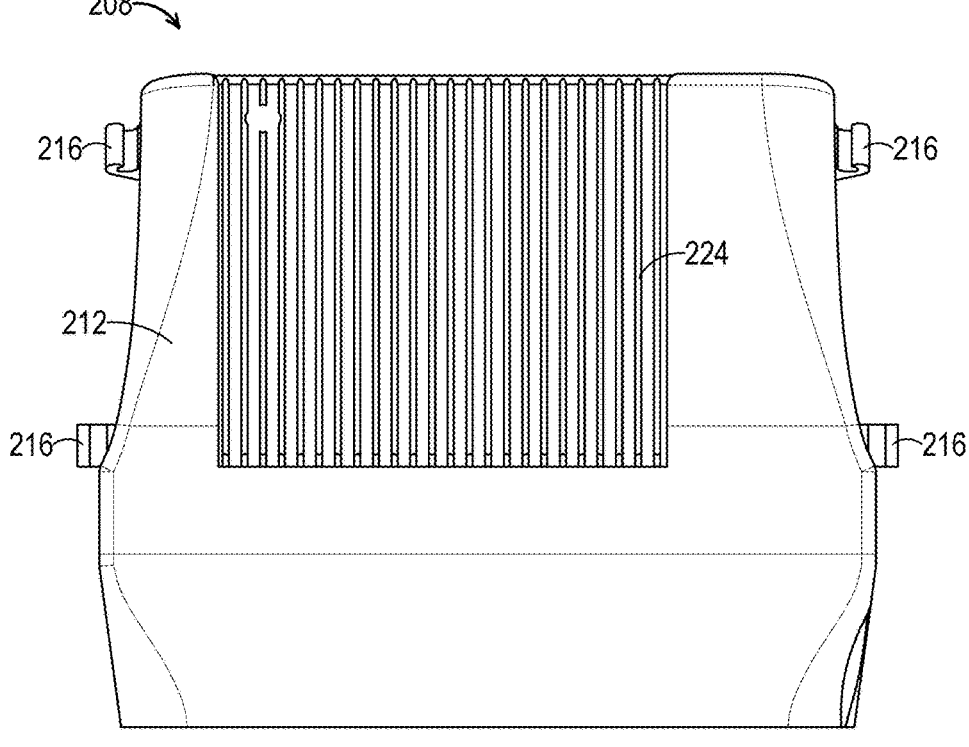
FIG. 7 is a top view of the device of FIG. 5.
Figure 8:
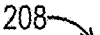
FIG. 8 is a top isometric view of the device of FIG. 5.
Figure 8:
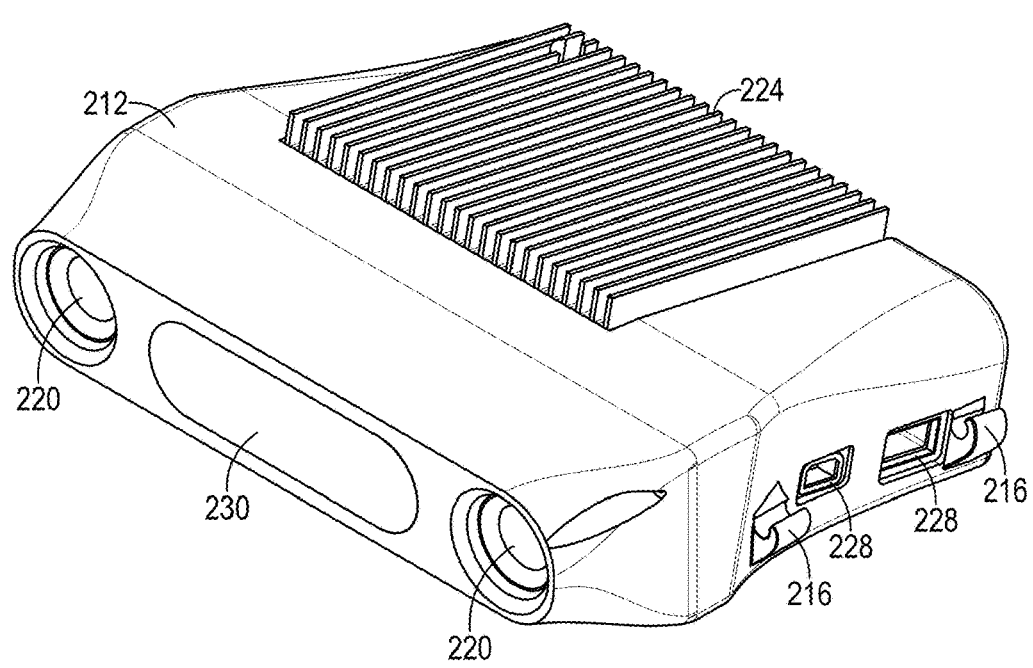
Figure 9:
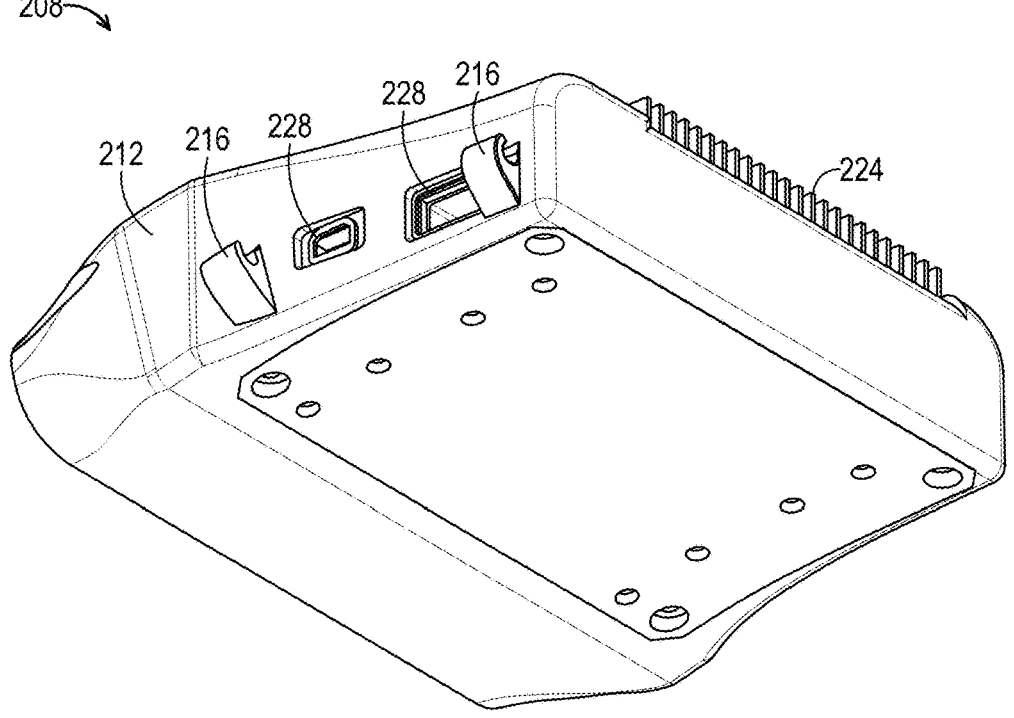
FIG. 9 is a bottom isometric view of the device of FIG. 5.

FIG. 5 is a side view of device 208, FIG. 6 is a front view of device 208, FIG. 7 is a top view of device 208, FIG. 8 is a top oblique view of device 208, and FIG. 9 is a bottom oblique view of device 208. Helmet-mountable device 208 has a housing 212 at least partially containing a stereo camera assembly (see FIG. 6), an onboard computer (not shown) and a power source (not shown). In some examples, housing 212 at least partially contains a sound-emitting device configured to produce audio notifications (not shown).

As shown in FIGS. 5-9, housing 212 of device 208 has a plurality of hooks 216 on lateral sides of the housing. The hooks are configured to facilitate attachment of the device to a cyclist's helmet (e.g., by receiving elastic strap(s)). This is an example mechanism by which the device may be attached to a helmet; in general, any suitable attachment device(s) may be used.

A front end of device 208 includes a pair of cameras 220 disposed in a stereo configuration (see FIG. 6). Cameras 220 are disposed to acquire stereo images. In typical use, device 208 is attached to a cyclist's helmet with cameras facing rearward, capturing images behind the cyclist. Cameras 220 in this example are disposed within housing 212 with lenses of the camera exposed such that images of the environment of the housing can be captured. Little or no part of the cameras extend beyond the profile of the housing. In this manner, the cameras are protected by the housing and are able to acquire image data of the environment. In some examples, the camera lenses may be protected by a transparent cover material (e.g., glass or plastic) to protect the lens outer surface during use.

In the depicted example, cameras 220 have a stereo baseline of 80 millimeters. Other suitable baselines may be used. In at least some examples, a larger baseline allows for a greater detection range by the camera but increases the size of the device, which makes it heavier and limits the configurations in which the device can be mounted. A baseline of 100 millimeters or less may, in at least some examples, allow for a suitable detection range without making the device too large. In general, a device configured to be mounted on a standard helmet has a baseline of no more than 200 millimeters.

In the depicted example, the cameras each have an EFL between approximately 1.5 millimeters and 4 millimeters (inclusive) and a pixel count between approximately 2 Megapixels and 12 Megapixels (inclusive). The cameras are visible-light cameras having pixel pitches that may be between 1 and 3 microns (inclusive). In some examples, infrared-sensitive cameras may additionally or alternatively be used; infrared-sensitive cameras typically have larger pixels than visible light cameras. This is an illustrative example and other camera EFLs, pixel counts, pixel sizes, and wavelength ranges may be used.

An onboard computer (not shown) is disposed inside housing 212. The computer is configured to control cameras 220 and to determine relative position information based on images acquired by the cameras. An example of a computer suitable for inclusion in the depicted example device is the Jetson Nano B.01 development board; however, any suitable computer may be used.

Device 208 includes a heat sink 224 configured to allow the computer to dissipate heat (e.g., to an environment of the housing). Any suitable heat sink may be used.

Device 208 includes a plurality of input/output ports (AKA I/O ports) 228 configured to facilitate data communication (e.g., data input and data output) to and from the onboard computer. For example, one or more of I/O ports 228 may be used to couple the onboard computer to a smartphone to facilitate generation by the smartphone of audio and/or visual indicators based on distance, position, velocity or speed information or to enable direct audio notifications via a speaker. As another example, one or more of I/O ports 228 may be used to couple the onboard computer to a desktop computer or external memory storage device.

In the depicted example, device 208 includes a light 230. Light 230 may be configured to illuminate the scene (e.g., to provide visibility and/or improve quality of images acquired by the cameras); additionally, or alternatively, light 230 may be configured to be selectively illuminated to provide warning(s). Light 230 may have an illumination brightness and/or illumination frequency controlled by the onboard computer. In some examples, the computer is configured to control the illumination based on the objects detected in the scene. For example, the computer may control light 230 to flash brighter and/or with a distinctive pattern in response to detecting a threat above a certain threshold; may control light 230 to dim when another micromobility user is detected in order not to impair their vision; and/or may exhibit other responses as may be warranted by what is detected. In other examples, however, light 230 is omitted or provides constant illumination at fixed brightness level(s).

In the depicted example, I/O ports 228 include USB, Ethernet, and Serial Interface ports, but in general, any suitable port(s) may be included. Device 208 may further include a wireless module disposed within housing 212 and coupled to the computer. In some examples, a wireless communication module is coupled to the device via one or more of I/O ports 228.

Figure 10:
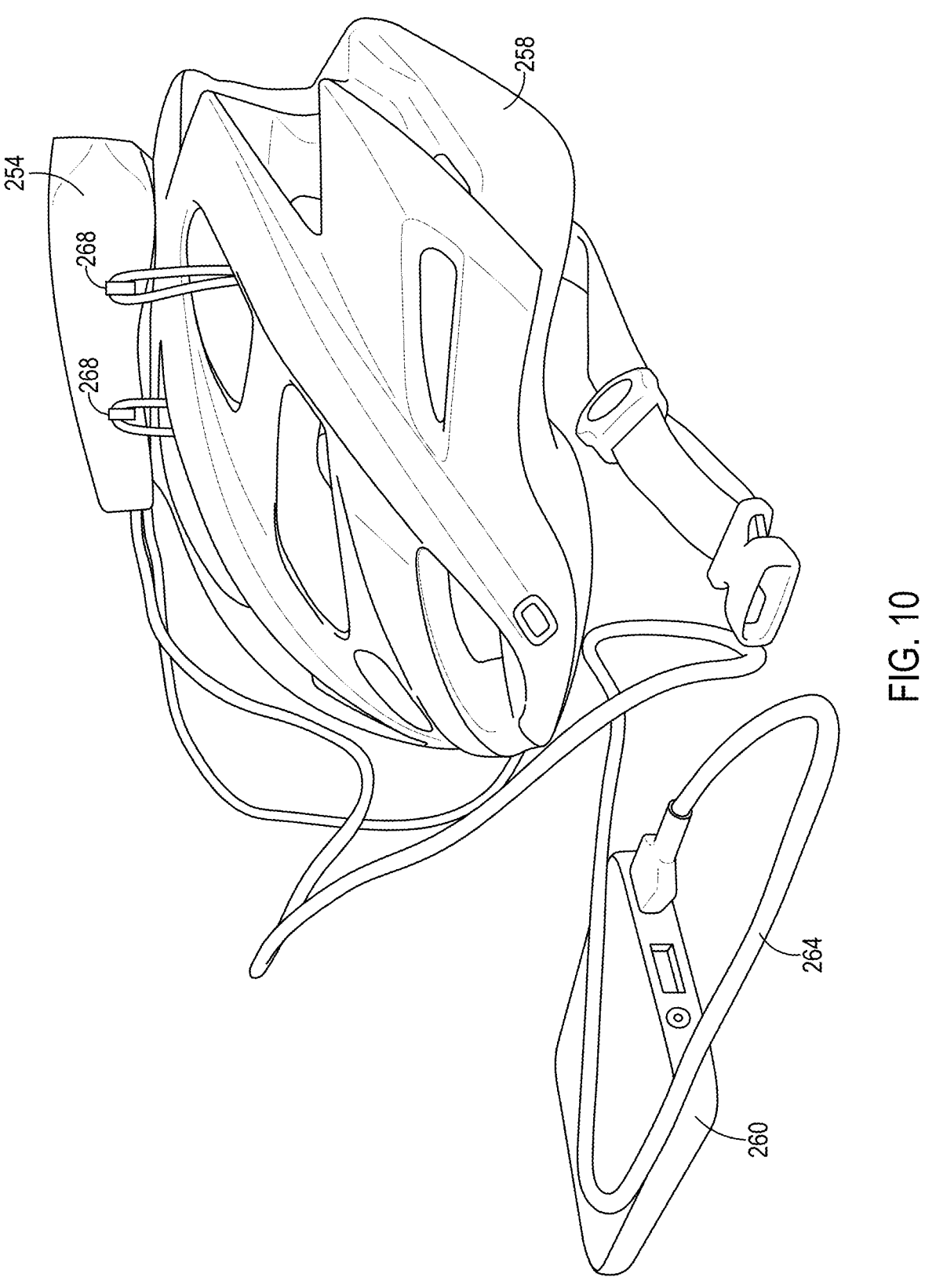
FIG. 10 is a side view of another illustrative helmet-mountable situational awareness device mounted to a helmet in accordance with aspects of the present disclosure.

FIG. 10 is a side view of another illustrative device 254 attached to a helmet 258. Device 254 is similar to device 208 described above, although device 254 incorporates a heat sink that does not extend from the top of the device. In this example, helmet 258 is a standard bicycle helmet of a type commonly worn by cyclists; in general, device 254 or 208 may be used with any suitable helmet. In some examples, some or all parts of the device (e.g., a stereo image assembly and/or onboard computer and/or power supply) are integrated into a helmet.

FIG. 10 depicts device 254 coupled to an auxiliary battery 260 by a cable 264. In normal use, device 254 may be further coupled (e.g., by a cable and/or wirelessly) to a smartphone, bike computer, and/or other suitable device configured to produce visual and/or audio indicators, as described above. For example, a display and/or audio output device of a smartphone may be used to provide warnings and/or other suitable information to a cyclist. Alternatively, or additionally, device 254 may include an internal audio emitter configured to emit audio notifications.

Device 254 has a plurality of hooks 268 on an exterior surface of a housing of the device. Hooks 268 are configured to facilitate attachment of device 254 to helmet 258. In the example depicted in FIG. 10, each lateral side of the housing has two hooks 268, and two elastic straps fasten device 254 to the helmet. Each strap has a first end received by a hook on a first side of the device and a second end received by a hook on the opposite second side of the device. This is an example mechanism by which the device may be attached to a helmet; in general, any suitable attachment device(s) may be used.

E. Illustrative Seat-Mounted Situational Awareness Devices

Figure 11:
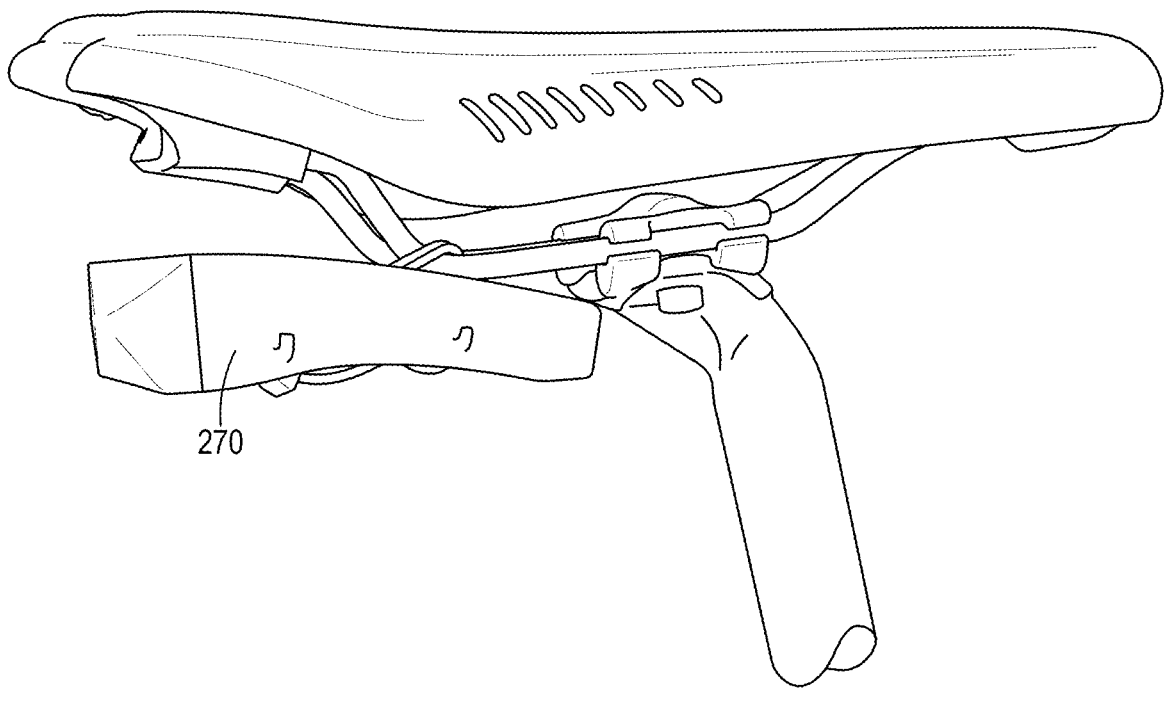
FIG. 11 is a side view of an illustrative seat-mountable situational awareness device mounted to saddle rails of a bicycle in accordance with aspects of the present disclosure.
Figure 12:
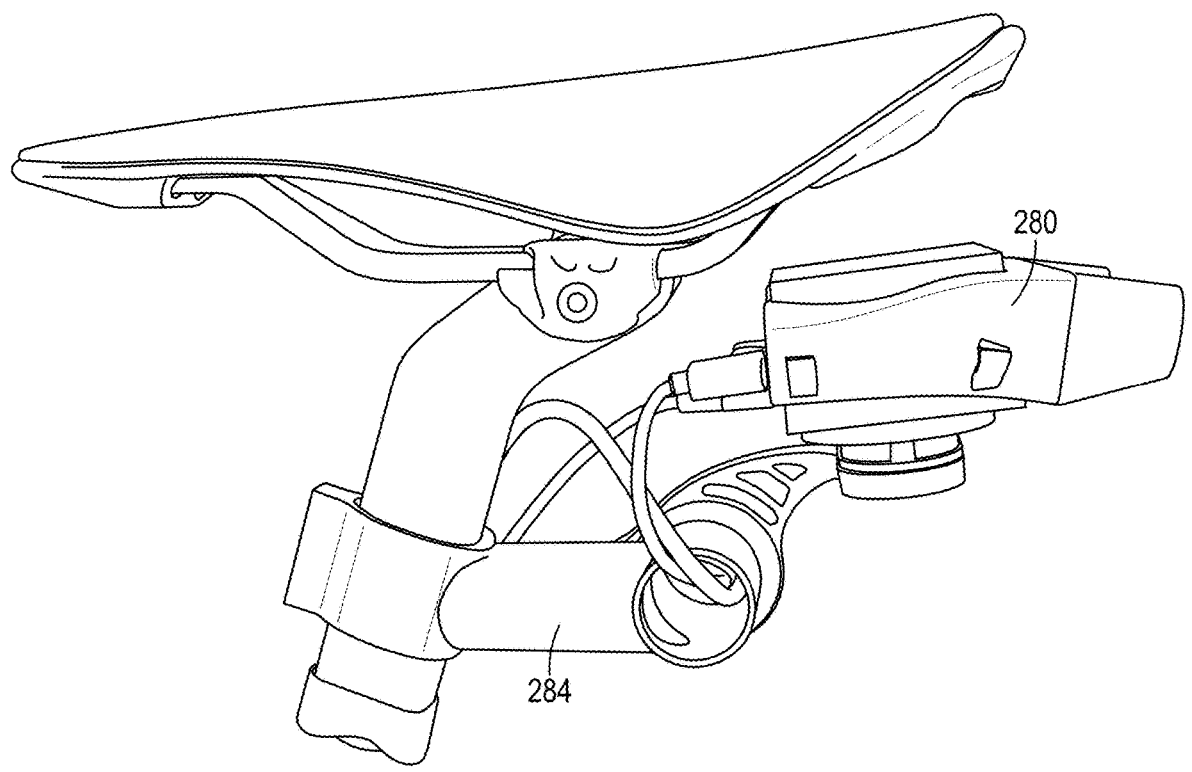
FIG. 12 is a side view of an illustrative situational awareness device mounted to a seat post of a bicycle in accordance with aspects of the present disclosure.

With reference to FIGS. 11-12, this section describes illustrative seat-mountable situational awareness devices 270 and 280 in accordance with aspects of the present teachings.

FIG. 11 is a side view depicting device 270 mounted to saddle rails of a bicycle. In the depicted example, device 270 is attached to the saddle rails by an elastic cord, but in other examples, any suitable attachment mechanism(s), including rigid mounts, may be used. In some examples, a seat-mountable situational awareness device is attached to the bicycle at another location in the vicinity of the seat, e.g., to the seatpost (e.g., as shown in FIG. 12 with device 280), to the saddle itself, to part of the bicycle frame, and/or any other suitable location(s).

FIG. 12 is a side view depicting device 280 mounted to a seatpost of a bicycle by a seatpost mount 284. In general, any suitable mount may be used to attach device 280 to the seatpost.

Devices 270, 280 may be substantially similar to helmet-mountable device 254. In some examples, a situational awareness device in accordance with aspects of the present teachings is configured to be removably attached to any one of several suitable parts of a bicycle or cyclist. For example, a device may be configured to be interchangeably mounted to either a helmet, a seatpost, a seat, and/or another suitable part of the bicycle or cyclist. Accordingly, a user may be able to attach the device to a helmet when going for a first ride and to attach the device instead to the bicycle seat when going for a second ride. This may allow the user to select the most appropriate mounting location based on intended use of the device, riding conditions, and/or any other suitable factor(s).

F. Illustrative Method of Determining Distance

With reference to FIGS. 13-17, this section describes an illustrative method for determining distance and/or vector position information between one or more objects and a stereo camera assembly (e.g., between the object(s) and a device including the stereo camera assembly, such as device 208 described above). This method is an example of a method for determining relative position information based on the displacement of an object or region of interest between stereo images (AKA the object disparity). In some examples, the method described herein is suitable for determining distance and/or vector position information in real time using processing logic (e.g., a GPU-based computer) dimensioned to be practically disposed onboard the device including the stereo camera assembly.

Figures 13, 14:
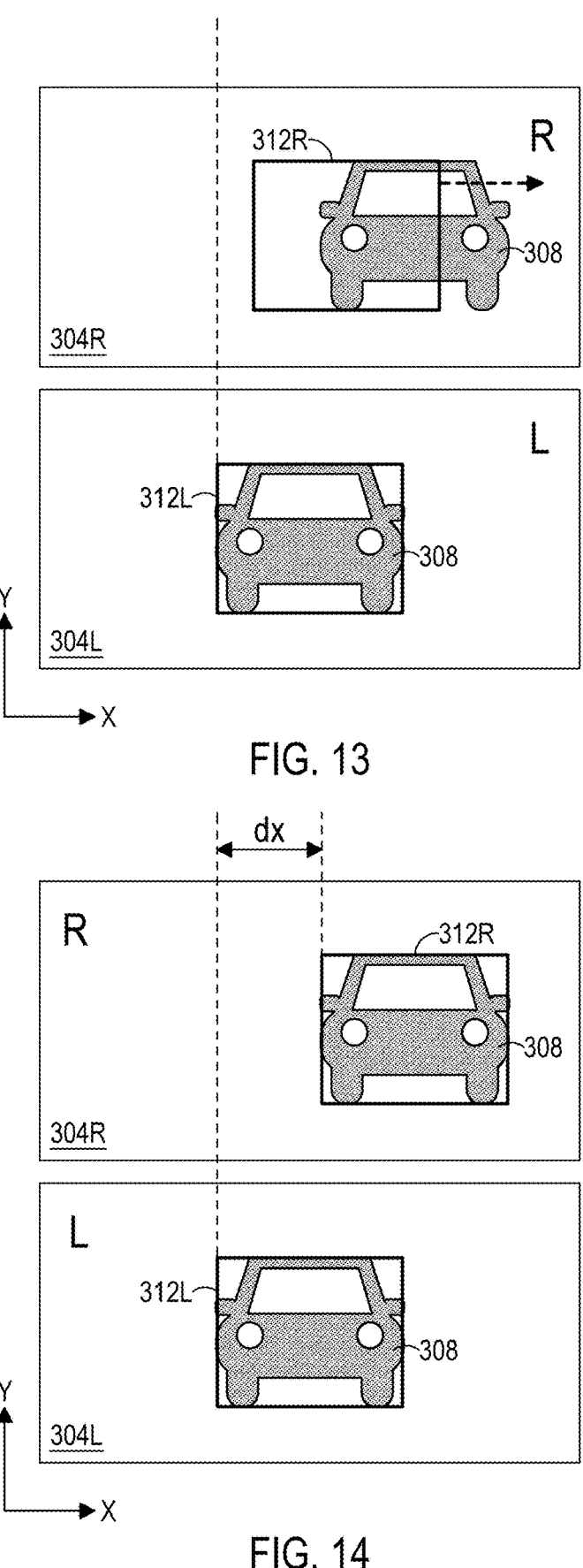
FIG. 13 is a schematic diagram depicting aspects of an illustrative method for determining distance based on a pair of stereo images in accordance with aspects of the present disclosure.
FIG. 14 is another schematic diagram depicting aspects of the illustrative method of FIG. 13.

FIG. 13 depicts an illustrative pair of stereo images 304L and 304R, acquired by the left and right cameras of a pair of cameras, respectively. The stereo images each include an image of an object, which for illustrative purposes in this example is car 308. In many typical use cases, images acquired by the pair of cameras will include more than one object of interest (e.g., two or more cars, or a car and a cyclist, or a truck and a pedestrian, or multiple motor vehicles, etc.). Relative position information may be determined for more than one object of interest based on a single pair of stereo images. For clarity of illustration, FIGS. 13-14 depict only car 308 and the associated description describes only car 308.

Processing logic (e.g., the onboard computer of a situational awareness device) is configured to localize the car within the image (e.g., to identify the region of the image corresponding to the car). Localizing the car within the image includes determining a bounding box 312L encompassing car 308 in image 304L. Localizing the car may include using one or more neural networks (e.g., deep neural networks), one or more machine learning techniques, and/or any other suitable methods.

Bounding box 312L in this example has a rectangular and/or square shape and is defined by a position, width, and height with respect to image 304L. Note that in other examples, any suitable object segmentation approach may be used in place of bounding boxes (e.g. segmentation approaches that determine all pixels associated with an object, providing an outline that generally follows the outline of the object in the image and is therefore more complex than a box shape.)

The width of the bounding box of this example may be defined as the number of pixels of the image over which the bounding box extends in a lateral (e.g., horizontal) direction, the height may be defined by the number of pixels over which the bounding box extends in a vertical direction, and the position of the box may be defined by the identity of one or more pixels at which a particular part of the box is located. For example, the position may be defined by the (X, Y) coordinates of the pixel nearest the lower left corner of the bounding box.

In the depicted example, the width of bounding box 312L is determined such that the box extends from a leftmost point of the image of the car to a rightmost point of the image of the car (e.g., the leftmost pixel occupied by the car to the rightmost pixel occupied by the car). The tolerance for determining the leftmost and rightmost pixels occupied by the car (e.g., exactly the leftmost pixel, the leftmost pixel plus or minus two pixels, etc.) can be selected based on purpose and/or on the computational abilities of a given processor and/or the precision of a given computational method. Similarly, the height of bounding box 312L is determined such that the box extends from a topmost to a bottommost point of the image of the car. Accordingly, the box fits the car tightly and includes little background imagery (or other imagery not corresponding to car 308) of image 304L. Selecting the bounding box size so as to reduce and/or minimize the amount of background imagery (or other imagery not corresponding to the region or object of interest) included in the box may enhance the accuracy and/or speed of recognizing the contents of the bounding box in image 304R, as described below. In some examples, if the contents of the box include a large amount of imagery not corresponding to the car itself, some of the box contents correspond to objects at significantly different distances relative to the camera than the car, and the distance computation may therefore fail and/or produce erroneous results. However, any suitable box size and shape relative to the car may be used. For instance, in some examples, the width of the box is selected to include a predetermined margin around the car (e.g., such that the box extends from ten pixels left of the leftmost pixel occupied by the car to ten pixels right of the rightmost pixel occupied by the car) to ensure feature uniqueness, or a smaller region within the area covered by the car (e.g., such that the box extends from two hundred pixels right of the leftmost pixel occupied by the car to two hundred pixels left of the rightmost pixel occupied by the car) to optimize processing efficiency.

The height of the bounding box may be selected on any suitable basis. In some examples, the height is selected to be large enough that the bounding box includes features sufficiently distinct to be recognizable in image 304R, but not so large that a significant portion of the box corresponds to objects at different distances from the car or that assessing a match with the contents of the bounding box in image 304R requires excessive processing power. However, any suitable height may be used. In some examples, the height of the box may not necessarily be determined such that the box extends precisely from the top to the bottom of the image of the car. In some examples, the box may be defined only by width and position and has a height of a single pixel. In some examples, the height of the box is selected to be equal to the width, irrespective of how much of the car is encompassed by the box in the vertical direction. This may simplify certain computations.

In some examples, a maximum box size (e.g., characterized by a maximum height, width, perimeter, or area) is defined and the bounding box height and/or width is selected to comport with that maximum. Establishing a ceiling for the box size may be beneficial because it may correspond to a maximum processing power that the method is expected to use (or to need in order to function as quickly as is appropriate for the use case). When an object is close to the camera and therefore occupies a large portion of the image, the maximum box size may be smaller than that portion of the image. This may result in the bounding box encompassing less than all of the object (e.g., encompassing a region of interest of the object). This generally allows the method to work effectively because when an object encompasses a large portion of the image, the portion of the image corresponding to the object is very likely to include features sufficiently discernible to facilitate matching in the other stereo image. Accordingly, a bounding box of the maximum size or smaller (e.g., a box bounding one or more of the discernible features in that portion of the image) may be used even though it does not include the entire object. When an object is far from the camera and therefore occupies a small portion of the image, the portion of the image corresponding to the object may be smaller than the maximum box size, such that the bounding box can encompass the entire object (though it need not; e.g., the box may encompass less than all of the object if suitable).

Determining the bounding box includes determining the position, width, and height of the bounding box, but need not include generating and/or displaying an image in which a graphical depiction of the bounding box is superimposed on image 304L. The bounding box is visually depicted in FIGS. 13-14 for illustrative purposes.

The processing logic is further configured to determine how far (e.g., by how many image pixels) the bounding box would need to be displaced from its position in image 304L such that, if disposed at the new position in image 304R, the box would encompass the image of the car in image 304R. The contents of bounding box 312L define a template image, and the processing logic is configured to determine a position within image 304R at which a template bounding box 312R of the same size and shape would have contents matching the template image. This may include rastering the template bounding box across image 304R, computing correlations between the contents of the template bounding box and the template image at each position, and determining the position at which the computed correlations indicated a best match. The difference in horizontal position between the best-match position of template box 312R in image 304R and the position of box 312L in image 304L is the displacement of the box and indicates the displacement of the car between the stereo images (AKA object disparity).

In some examples, determining the displacement of the bounding box includes the following steps:

Defining a template bounding box 312R having the same width and height as box 312L and a position in image 304R that is the same position box 312L has in image 304L. For example, if a lower left corner of box 312L is disposed at pixel coordinates (54, 79) in image 304L (i.e., the pixel in the 54th row of pixels and 79th column of pixels of image 304L), then box 312R is positioned with its lower left corner at pixel coordinates (54, 79) of image 304R.

Determining an indication of whether and/or to what extent box 312R encompasses the image of the car in image 304R (e.g., to what extent the contents of box 312R at this position matches the contents of the template image defined by box 312L). Because images 304L, 304R are stereo images, the car generally does not appear at the same position in each image. Accordingly, the template bounding box placed in image 304R at the same position that bounding box 312L appears in image 304L generally does not bound the image of the car in image 304R.

Rastering template bounding box 312R laterally to the right (in the X direction defined by the axes depicted in FIG. 13), obtaining at each raster step an indication of whether and/or to what extent the contents of template bounding box match the contents of the template defined by box 312L. In some examples, template box 312R is rastered all the way across image 304R, and the displacement is determined based on the raster position corresponding to the best indication of a match. In some examples, box 312R is rastered only until the template bounding box encompasses the car in image 304R in the lateral (X) direction (e.g., until the contents of box 312R match the template image). Accordingly, the method may include shifting the box, determining whether the shifted box encompasses the car, and shifting the box again in response to determining that the shifted box does not encompass the car. In some examples, the method includes shifting the box at least once more after determining that the shifted box does encompass the car, which allows the processor to determine that the box has now been shifted too far and the previous position was accurate. This may allow for increased confidence in the determination by, e.g., sub-pixel interpolation across an inflection point in the optimization function (minimum or maximum, as appropriate depending on the merit function type). FIG.

13 depicts bounding box 312R having been rastered at least one step away from its initial position. FIG. 14 depicts box 312R encompassing car 308 (that is, box 312R is at the correct displacement from its original position corresponding to the position of box 312L, with a best match between the contents of box 312R and the contents of box 312L). Rastering the template box includes shifting it rightward by a space of one or more pixels or by fractional pixels via interpolation. The number of pixels in the space may be predetermined or determined ad hoc (for example, the number of pixels in the space may decrease as the box comes closer to encompassing the car, so as to increase the precision of the determination). Determining whether the template box encompasses the car in 304R may include using one or more commonly used template matching approaches, such as Squared Difference or Cross Correlation methods (e.g. OpenCVs TM_SQDIFF, TM_CCORR), and/or any other suitable template matching algorithm(s). In this example, the images are acquired by a pair of cameras oriented in a horizontal configuration, such that the baseline defined between them is parallel to the ground. Accordingly, the shift of the template box being determined is the shift in the horizontal direction, and so the template box is rastered in the horizontal direction. In general, the shift is determined in a direction parallel to an axis defined by the baseline. Accordingly, in examples in which the cameras are oriented in a configuration other than horizontal, the shift is calculated in a direction parallel to an axis defined by the baseline in that configuration by rastering the template box in that direction.

The displacement of the template box 312R from its original position (i.e., from the position corresponding to the position of bounding box 312L in image 304L) is disparity dx described above with respect to FIGS. 2-3. Accordingly, a distance between the car and the cameras can be determined by calculating $D \approx EFL \times B/dx$, where D represents the distance, EFL is the effective focal length of each of the cameras, and B is the stereo baseline of the cameras. Because the cameras are mounted to the cyclist and/or the bicycle, the distance between the cameras and the car is a good approximation for the distance between the cyclist and the car.

Optionally, template bounding box 312R may be dithered in the vertical (Y) direction one or more times (e.g., after one or more rastering steps). The processing logic may be configured to determine that the dithered box encompasses the car in the vertical direction to at least approximately the same extent as before to detect discrepancies in calibration or rectification from the as-built state. A change in the extent to which the box vertically encompasses the car may indicate a problem (e.g., that the stereo images are not as expected and thus may be unsuitable for determining a distance to the car, that the object detection calculation has failed, etc.). If the dithering reveals such a problem, or continues to indicate such a problem over a certain period of time, the processing logic may compensate algorithmically when possible or return an error.

Alternatively, or additionally, the disparity dx may be determined by determining a bounding box for the car in image 304L, determining a bounding box for the car in image 304R, and determining the difference in lateral position of the two bounding boxes (e.g., subtracting the X coordinate defining the position of one box from the X coordinate defining the position of the other box).

In some examples, the processing logic is configured to determine a bounding box encompassing a region of interest of the car rather than the entire car. For example, the bounding box may encompass the headlight region of the car, a predetermined corner of the car, and/or any other suitably featured region. This may be done in any suitable example and may be particularly helpful in cases, where, e.g., the car occupies a large fraction of the first image and therefore creates an unnecessarily large template image to match in the second image (e.g., because determining the extent to which a portion of the second image matches the large template requires a large amount of processing power and/or because the large template image is more than large enough to include one or more suitable features that are sufficiently discernible to facilitate identifying the best-match portion of the second image). Another example is detecting illuminated headlights during challenging lighting conditions (e.g. poorly lit streets).

In the example described above, a bounding box is determined for the lefthand image and the template image defined by the bounding box is rastered across the righthand image in the rightward direction. In other examples, the bounding box may be determined for the righthand image and the template may be rastered across the lefthand image in the leftward direction. In some examples, both are performed (that is, the bounding box is determined for the lefthand image and a template rastered across the righthand image, and additionally a bounding box is determined for the righthand image and a template is rastered across the lefthand image), which may allow greater confidence in the distance information determined.

Figure 15:
FIG. 15 is an illustrative photo, including illustrative bounding boxes, suitable for use in the method of FIG. 13.

In examples wherein the images include more than one object, the processing logic may be configured to determine the azimuthal position of and distance to one or more of the objects in parallel, in serial, or in a suitable combination of parallel and serial. The angular position and distance information may be combined to form a position vector of the object relative to the camera assembly. FIG. 15 depicts an example image 340 in which a bounding box is determined for each of a plurality of cars and for a cyclist.

In some examples, the processing logic is further configured to classify objects in the image as being cars, trucks, buses, motorcycles (e.g., motor vehicles); pedestrians, cyclists (e.g., non-vehicles); and/or any other suitable types of objects (e.g. dogs). For example, the processing logic may be configured to classify car 308 as being a car (e.g., to recognize the car as belonging to a "car" category of objects). Classifying object(s) in the image may include using one or more neural networks, machine learning methods, and/or other suitable techniques.

Information about the type of object in the image may be provided to the cyclist along with information about the distance to and/or position of the object. In some examples, the information provided comprises a particular type of object associated with the object in the image. For example, if a first object has been determined to be a car and a second object has been determined to be a truck, the information provided may indicate that the first object is a car and the second object is a truck. Alternatively, or additionally, the information provided may simply indicate that both objects are motor vehicles.

In some examples, a full outline of the object (e.g., an outline of car 308 that conforms to a shape of the car) is used in the above method or other suitable methods rather than a bounding box.

Figure 16:
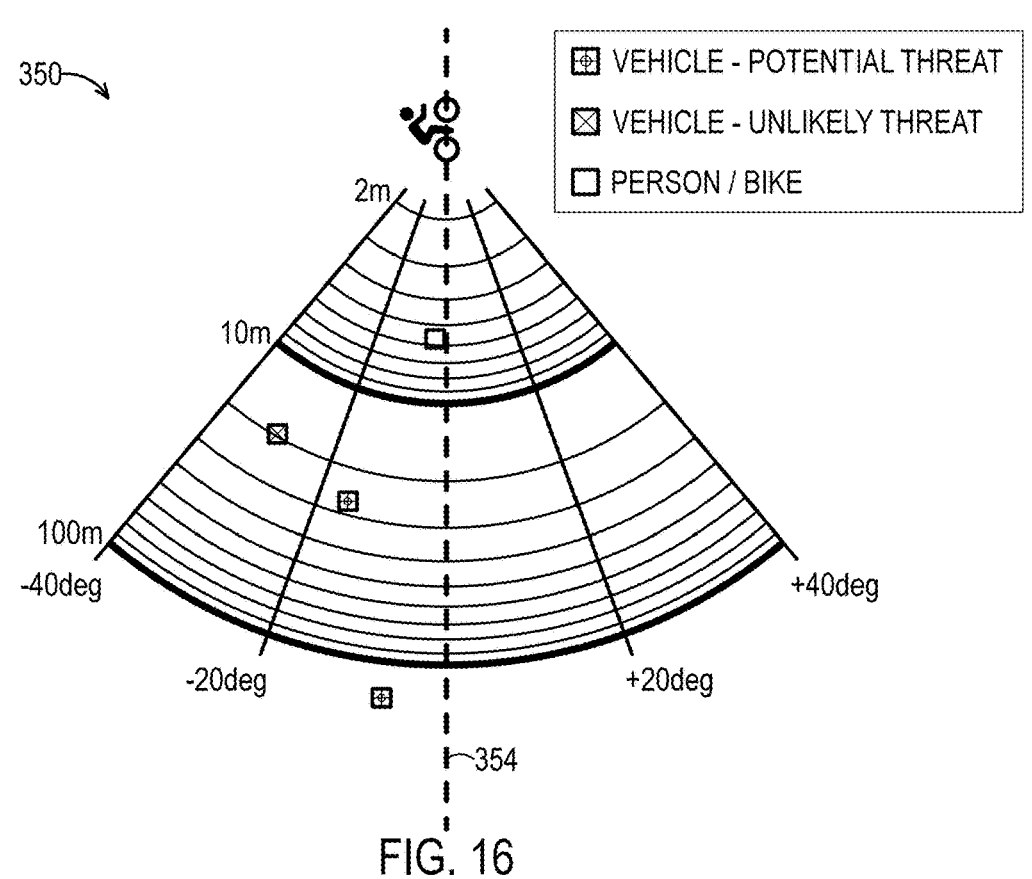
FIG. 16 is an illustrative diagram conveying distance and threat information of objects detected behind a cyclist using an example situational awareness system in accordance with aspects of the present disclosure.

FIG. 16 depicts an example diagram 350 in which respective positions of objects depicted in FIG. 15 are indicated. Diagram 350 is an example of a diagram that may be displayed to a cyclist at a display of a cycling computer, smartphone, or other suitable display device. Diagram 350 indicates a distance to each object (e.g., a radial distance having a distance component along an axis 354 defined by the camera system and/or centerline of the bicycle, and a component along a lateral axis orthogonal to axis 354), a type of each object (e.g., vehicle or person), an angular and/or azimuthal position of each object (e.g., with respect to axis 354), and a respective predicted threat level of at least some of the objects. The angular position and radial distance may be determined based on the determined distance of the object and a lateral position of the object within the image (e.g., pixel coordinates of a center of the object within the image, and/or any other suitable measure of the lateral position of the object in the image).

The threat level may be determined based on any suitable factors. In the depicted example, objects classed as vehicles and determined to be within plus or minus 20 degrees of axis 354 are predicted to be potential threats, objects classed as vehicles and determined to be outside that angular range are predicted to be unlikely threats, and objects not classed as vehicles are not assigned a predicted threat level. However, any suitable threat prediction may be used. For example, in some cases non-vehicle objects can be classed as potential threats. In some examples, different gradations of threat level are used (e.g., unlikely threat, likely threat, very likely threat; numerical threat grade ranging from 0 to 10; etc.). In some examples, threat level is determined at least partially based on determined distance to the object and/or determined velocity of the object. In some examples, objects predicted to pass within a certain proximity to the user are determined to be likely threats (e.g. within one lane, within one meter, and/or any other suitable threshold). In some examples, at least some factors on which threat level is based and/or at least some aspects of the provision of threat information are selectable by a user.

The processing logic may be configured to perform the steps of localizing object(s) in the image, determining respective distance(s) between the camera and the localized object(s), and providing the determined distance information to the user at any suitable frequency. In some examples, the steps are performed so as to provide updated distance information to the user in real time or near real time. Object type may be determined and provided at any suitable frequency, and may be determined or confirmed less frequently than the distance information. For example, after a particular object has been determined to be a car, the processing logic may be configured to save the information that the object is a car and accordingly may not be configured to reclassify that same object every time it updates the distance to that object. In some cases, the object type may be determined only once for each object. In some cases, the object type of a given object may be determined two or more times (e.g., to confirm accuracy of the classification). In some examples, the classification is automatically performed each time the object is localized (e.g., because an algorithm that determines the bounding box for the object automatically also classifies the object) but the resulting classification information is not necessarily used by the processing logic each time it is localized.

In some examples, a speed and/or velocity of the object relative to the cyclist is determined based on a rate of change of the determined distance to and/or position of that object.

The determined speed and/or velocity may be provided to the user and/or used to at least partially determine the threat level of the object.

Figure 17:
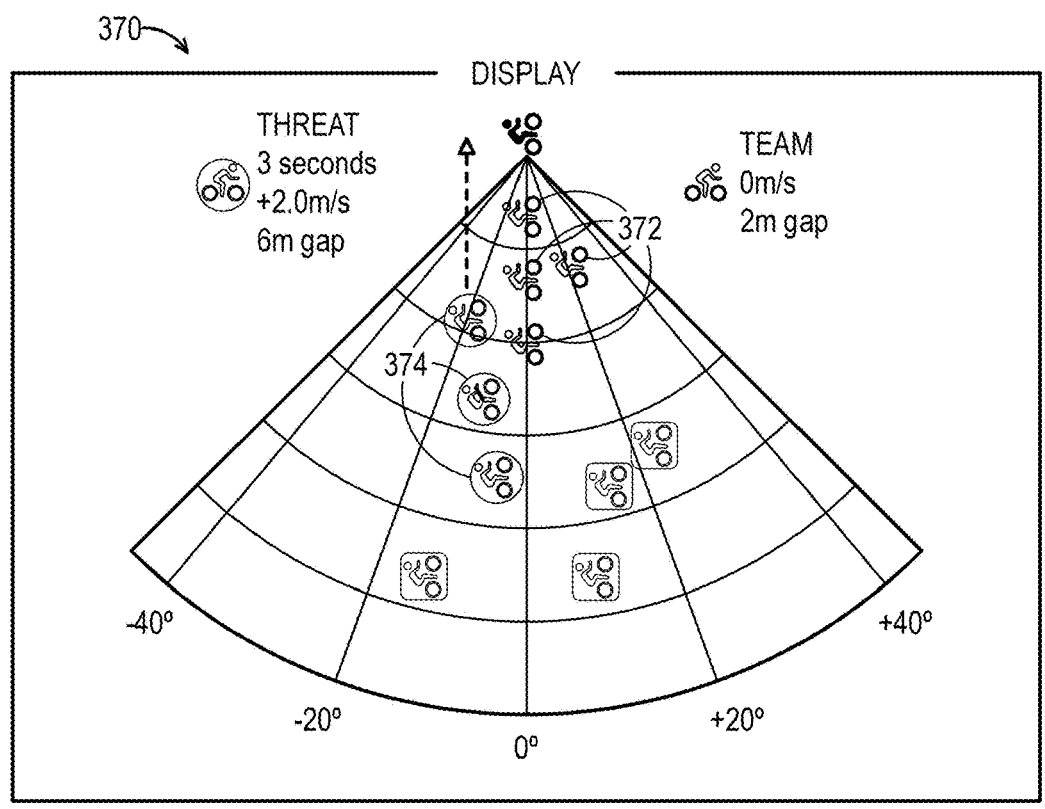
FIG. 17 is an illustrative diagram conveying information related to cyclists riding behind a cyclist using an example situational awareness system in accordance with aspects of the present disclosure.

In the example described above, the determined position and object type information is used to apprise a cyclist of potential threats or future threats to their safety. In general, methods of determining and providing information about objects in the camera view may be used for any suitable purpose. FIG. 17 depicts an example diagram 370 displaying information related to other cyclists behind the cyclist who has the stereo camera system. Diagram 370 indicates that a plurality of cyclists 372 who are on the cyclist's team are moving at the same speed as the cyclist at a two-meter gap behind the cyclist. A plurality of other cyclists 374 not on the cyclist's team are disposed at a six-meter gap behind the cyclist and are approaching the cyclist at a relative speed of two meters per second, making them a potential threat to overtake the cyclist. The processing logic of the system may be configured to determine the position, speed, and distance of cyclists 372, 374 using methods of determining relative position information as described above.

The processing logic may be configured to determine whether cyclists captured in the camera view are on the same team as the cyclist using the system by any suitable method. In some examples, each cyclist on the team bears a marker identifiable by the processing logic (e.g., a visual marker identifiable in the captured image using object detection or other suitable methods). In some cases, a race-plate number may be used as a visual marker. In some examples, the processing logic is configured to recognize other cyclists based on a team jersey or other uniform worn by each cyclist (e.g. teammates or competitors of interest). In some examples, a neural network is trained to recognize individual cyclists based on photographs of the cyclists, which may include image data acquired by the system.

In some examples, the system is configured to produce audio warnings when a non-teammate cyclist is determined to be making measured progress against or about to overtake the cyclist. As described above, audible alerts may include pre-recorded and/or AI-generated natural language (e.g., "Competitor approaching, passing in 2 seconds"), differentiated tones, and/or any other suitable sound(s).

In some examples, the system is configured to produce audio warnings when a trailing cyclist is determined to be falling behind the cyclist (e.g., "Bob has been dropped" and/or any other suitable audio alert).

In some examples, a forward-facing stereo image assembly is used to determine a range, closing speed, and/or time to intercept a cyclist who is ahead of the cyclist using the assembly.

In some examples, stored data is used later (e.g., after a race or group ride) to analyze how attacks developed, relative speeds during breakaways, why an accident occurred, and/or any other suitable information. In some examples, the stored data may additionally or alternatively be used to train machine learning and/or AI aspects of the system.

In the depicted example, diagram 370 depicts a plurality of cyclists who are not identified as being either teammates or non-teammates. The system may be configured to classify as teammate or non-teammate only those objects that are within a certain distance and/or angular range of the cyclist, and to refrain from classifying other objects. It may be unhelpful to the cyclist to have this information about cyclists who are outside a certain distance and/or range, and it may unnecessarily burden the computational resources available to classify cyclists who are outside this distance and/or range. In some examples, the method(s) used by the processing logic to determine whether a cyclist is a teammate may work poorly if the cyclist is too far away.

G. Illustrative Depth Map Method

Figure 18:
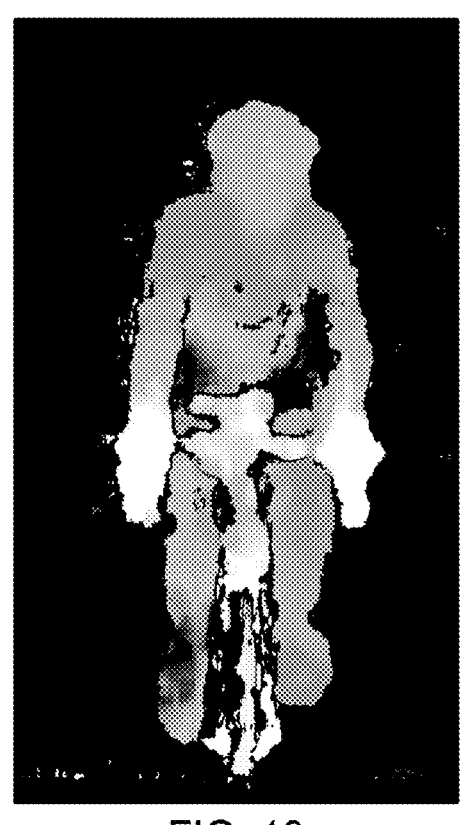
FIG. 18 is an illustrative pixelwise depth map obtained using an example situational awareness system in accordance with aspects of the present disclosure.

With reference to FIG. 18, this section describes an example method of using a situational awareness system to generate a depth map of an object of interest, such as a cyclist. This example includes using a stereo image assembly and processing logic in accordance with the present teachings. However, instead of (or in addition to) determining a distance to an object appearing in the acquired stereo images, this example includes determining a depth map of one or more objects.

FIG. 18 depicts an example depth map 400 of a cyclist. In this example, depth map 400 is determined based on stereo images acquired using a rearward facing stereo image assembly mounted on a vehicle driving in front of the cyclist. In other examples, the stereo images may be acquired using an assembly mounted on another cyclist riding in front of the imaged cyclist. The depth map may be generated by methods including, e.g., matching small subsets (AKA blocks) of pixels in the left image to corresponding pixels in the right image (or vice versa). This may, in at least some examples, require more processing power than the template matching method described above with reference to FIGS. 13-14.

Depth map 400 is a pixelwise depth map in which each pixel of a plurality of pixels has a depth value representing a distance between the camera and the object(s) appearing in the image at that pixel. In the depicted example, the depth value is represented visually in grayscale, with lighter shades indicating a near depth (i.e., a small distance away) and darker shades indicating a far depth (i.e., a greater distance away). In other examples, the depth value is represented visually in the depth map by color (e.g., an RGB value), where red indicates a near depth (i.e., a small distance away) and blue indicates a far depth (i.e., a greater distance away). Accordingly, the depth map provides an indication of how near or far different parts of the cyclist's body and bicycle are relative to the camera.

In the depicted example, the grayscale values are calibrated such that pixels corresponding to faraway objects (e.g., a background of the image) are all a dark gray, with pixels corresponding to the relatively nearby cyclist (e.g., in the foreground of the image) having a finer gradation of shades of gray. In some examples, depths greater than a certain threshold value may be assigned the darkest shade on the scale.

Depth information about the cyclist's body and/or bicycle can be used via human interpretation of quantitative depth data or automated pose estimation techniques to, e.g., facilitate analysis of the cyclist's body position for aerodynamics, ergonomics, and/or drafting form. For example, analysis of the depth map may allow the cyclist, a trainer, and/or other suitable person to observe that a cyclist's aerodynamic tuck position has an unfavorable frontal area profile, that the cyclist's arms are too widely or too narrowly spaced, that their bicycle is poorly fitted to them (e.g., torso, arm, and leg angles are suboptimal), that the cyclist's movements or pose should be improved, and/or any other suitable information relating to performance or comfort under real-world riding conditions.

In some examples, the depth map and/or information obtained based on the depth map can be integrated with data provided from another source to enhance analysis. Suitable data may include power and/or speed data obtained from a cycling computer coupled to the cyclist's bicycle, data from a heart rate monitor or other biological monitor, and/or any other suitable data.

In some examples, the stereo images upon which the depth maps are based are acquired in real time and the depth maps are created asynchronously (e.g., after the bike ride, or during the bike ride but with a delay relative to real time). For example, the depth maps may be provided as part of a SaaS model. This may be suitable in cases where, e.g., the computer being brought along for the ride lacks the processing power to produce depth maps in real time or near real time. However, depth maps may be produced in real time or near real time in examples in which a sufficiently powerful computer is available (e.g., because the computer can be brought along in the vehicle or bicycle that carries the camera, because image data can be uploaded to a remote computer and depth maps can be computed and downloaded from the remote computer sufficiently quickly, because a computer is developed that is small enough to fit in a helmet- or bicycle-mounted housing and yet powerful enough to perform the computations in real time, etc.).

Unlike some known systems where depth information can be provided only when the cyclist is riding a stationary bike in a controlled setting, this example enables analysis of the cyclist riding in real conditions in a real environment.

In the depicted example, the depth map is a pixelwise depth map having a depth value associated with each image pixel. In other examples, a depth map may have a depth value associated with subsets of pixels (or other subsets of the image) rather than a depth value for each pixel. Such a depth map may have a lower resolution than a pixelwise depth map but may, e.g., be computationally easier and/or faster to compute.

H. Micromobility Platform Overview

In general, a digital platform for micromobility in accordance with aspects of the present teachings may be configured to receive sensed real-world data relating to micromobility and to provide micromobility-related data and/or services to users.

Modern micromobility options such as bicycles, e-bikes, e-scooters, and e-skateboards have the potential to significantly reduce the environmental impact of commuting and local travel (relative, e.g., to commuting and traveling by automobile). Unfortunately, many barriers remain to increasing adoption of micromobility travel modes. For example, lack of widespread infrastructure suitable for micromobility (such as dedicated bike lanes) and the associated risk of motor vehicle accidents is a significant barrier.

As another example of existing barriers to adoption of micromobility, limited resources are currently available for micromobility users to inform their choice of micromobility travel routes. Many known mapping services show bike lanes and recommended routes, for example, but provide no information regarding the effectiveness of these bike lanes or recommended routes in separating micromobility and motor vehicle traffic, nor do they provide information relating to the impact of real world conditions on micromobility travel. Websites exist where micromobility users can report hazardous conditions or accidents to inform the community, local governments, and/or other parties who actively seek out information at those websites, but the websites can accept only user reports consisting of qualitative descriptions of conditions (e.g., text-based descriptions based on a user's recollection of their experience). Additionally, these websites rely on users having a predisposition to make the effort to write a summary and upload data to the website. As a result, they are not widely used. An example of such a website is the Street Story website tool created by the University of California at Berkley's Safe Transportation Research and Education Center, currently accessible online at https://streetstory.berkeley.edu/reports.php.

The platform described herein facilitates micromobility use and improves the micromobility experience. In some examples, the platform receives data generated by user devices (e.g., mobile phones, bike computers, and/or any other suitable devices) of micromobility users in a particular area. Based on this real-world data, the platform generates (e.g., automatically and/or manually) information, statistics, alerts, and/or other data and/or output of interest to micromobility users. For example, the situational awareness device described above has the ability to collect data regarding the number of motor vehicles passing a user (e.g., as the user rides a bicycle), the vector position of the vehicle(s) over time, the speed at which the vehicles approach and pass, the closest distance at which they pass, and the type of vehicle involved.

When quantitative data is collected by user devices and combined with route tracking (e.g., based on location data sensed by a GPS sensor of the user device, manual labeling by a user, and/or any other suitable method), statistics can be generated. For example, the platform may generate user-specific statistics (e.g., an average or fastest travel time of the user along a particular route, the number of vehicles passing a user and their passing speeds, the closest proximity of a given vehicle to the user, the types of vehicles passing the user, etc.) the number of vehicles passing a user and their passing speeds, the closest proximity of a given vehicle to the user, the types of vehicles passing the user, etc.) and/or statistics based on aggregate user data (e.g., an average time of all users along a particular route, average number of vehicles passing a user, etc.). Statistics based on user-specific data and/or aggregate data may be displayed to a user, overlaid on a route map (e.g., for use by a single user, by a single user and specific users with whom the user has shared the map, and/or by all users), and/or used in any other suitable manner.

With sufficient amounts of user data over sufficient time from sufficient locations, the platform may generate world-wide maps showing the effectiveness of routes being used by micromobility users over all, or at least a large portion of, the world. These maps can be used by other platform users to inform their decisions when planning their routes; by government entities to inform decisions about traffic planning and infrastructure improvements; by researchers in traffic or infrastructure planning, urban development, public health, and/or any other suitable field(s); and/or by any other suitable parties. Additionally, algorithms combining this data with other relevant factors such as solar angle, weather, traffic camera information, etc. may be used to suggest routes and to provide real time updates during travel.

In some examples, a platform in accordance with aspects of the present teachings includes one or more social media features and/or a social media network. An additional barrier to frequent micromobility use is the psychological inertia to start and, once started, to make micromobility use a habit. Social networking aspects of the platform address this problem by incentivizing micromobility use and facilitating habit formation. For instance, in some examples the platform includes social media aspects that provide user awards or commemorate achievements of user milestones or goals based on using micromobility modes of transit, thereby incentivizing micromobility use.

The user awards may be based on metrics relevant to micromobility usage. A few examples of such metrics are greatest number of days commuting by bike (e.g., days per week, month, and/or year), longest streak of days including at least one micromobility trip, greatest number of miles traveled by micromobility (e.g., in a given time period), and/or any other suitable metrics. In some examples, user awards are based on computed metrics computed based on user data. Examples of computed metrics include an amount of fuel saved by traveling by micromobility rather than automobile, an amount of money saved corresponding to the amount of fuel saved, an equivalent carbon offset corresponding to the fuel saved, and/or any other suitable metrics.

The social network of the platform is configured to enable users to choose to share their data and awards (e.g., with their private contacts or groups, or publicly with all platform users). In some examples, users who choose to share their detailed data publicly may compete for awards on overall leaderboards. Leaderboards may be grouped in any suitable manner, including geographically (e.g., by city, region, state/province, region, nation, etc.), demographically (e.g., by age, gender, type or model of micromobility vehicle, etc.), by custom groupings (social groups, corporate groups, etc.), and/or any other suitable grouping(s).

In some examples, data associated with user awards is used by the platform to determine statistics and/or to generate maps, as described above.

I. Illustrative Platform

Figure 19:
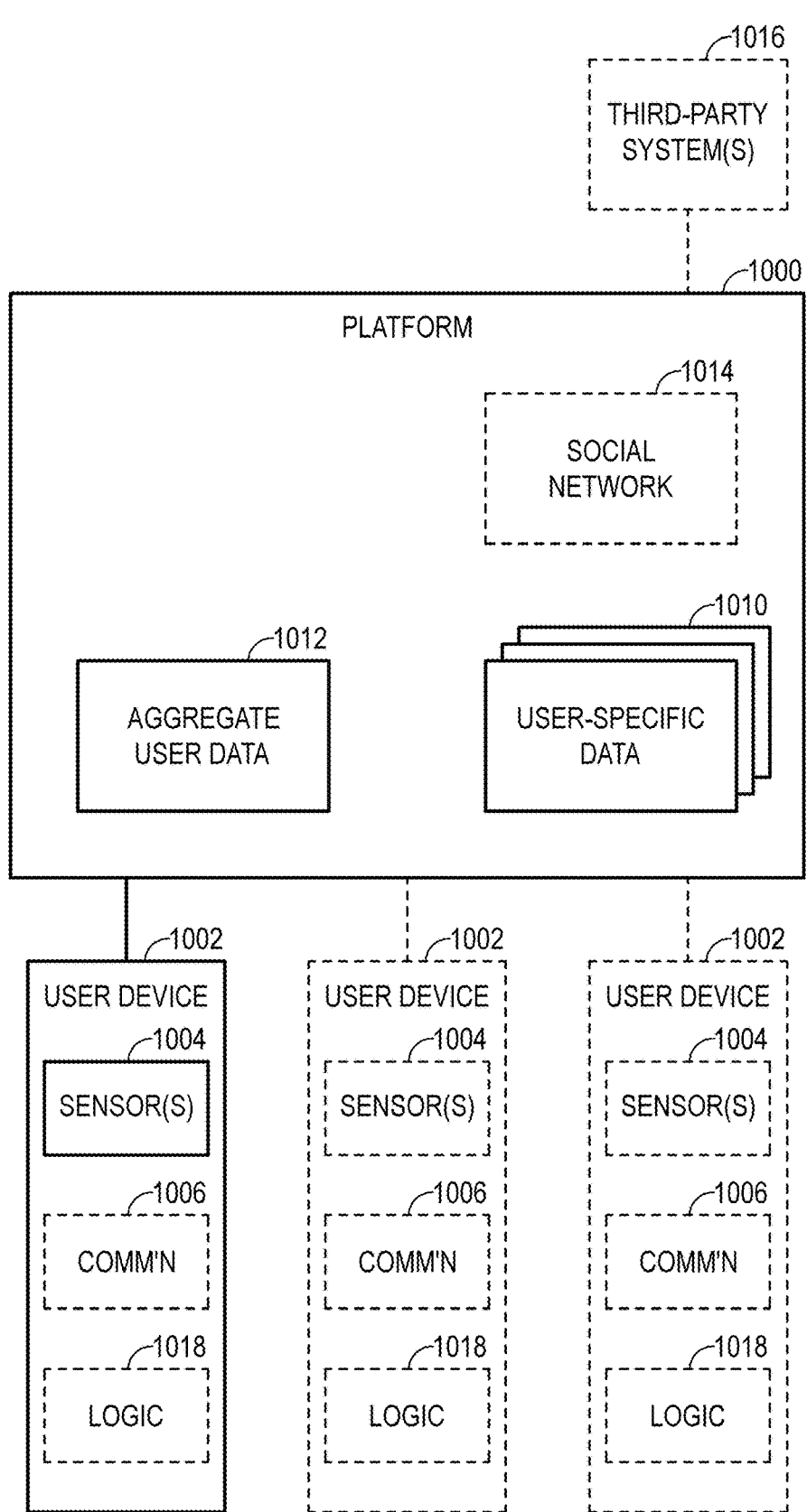
FIG. 19 is a schematic diagram of an illustrative digital platform related to micromobility, in accordance with aspects of the present disclosure.

With reference to FIG. 19, this section describes an illustrative digital platform 1000 in accordance with aspects of the present teachings. Platform 1000 is an example of the platform described above.

Platform 1000 is configured to be accessed by one or more user devices 1002. Each user device 1002 may comprise any suitable device for acquiring data related to micromobility and enabling communication of acquired data to platform 1000. For example, user device 1002 may comprise a smartphone, a tablet, a bike computer and/or other suitable dedicated mobile digital device, a laptop computer, a desktop computer, and/or any other suitable device(s). Not all user devices that access the platform are the same type of device; in general, the platform is configured to be accessible by any suitable type of device.

User device 1002 includes one or more sensors 1004 configured to acquire data related to micromobility. For example, sensors 1004 may include cameras and/or other sensors configured to capture image data; GPS sensors and/or other devices configured to sense location-related information; speedometers and/or other devices configured to sense speed; odometers and/or other devices configured to sense distance traveled; cadence sensors and/or other devices configured to sense a revolution rate (e.g., rpm) of a wheel of a vehicle; battery sensors configured to sense voltage, temperature, and/or other properties of a battery (e.g., of a vehicle); radar sensors and/or other sensors configured to sense motion of other objects; accelerometers; inertial sensors; compasses; temperature sensors; light intensity sensors; timers, clocks, and/or other sensors configured to sense time-based information; heart rate monitors and/or other sensors configured to sense information about a user's body; AI and/or machine learning based sensors configured to identify objects (e.g. other micromobility users, motor vehicles, trash cans, road debris, proximity to a curb or roadway marking, etc.) and/or any other suitable sensor(s).

User device 1002 is configured to facilitate communication of data sensed by sensor(s) 1004 to platform 1000. For example, user device 1002 may include a communication unit 1006 (e.g., a unit configured for WiFi communication, Bluetooth® communication, cellular communication, and/or any other suitable wireless or wired communication) configured to communicate with platform 1000 (e.g., via a network).

Additionally, or alternatively, user device 1002 may be configured to enable data to be offloaded from the user device to a second device, such as a computing device or a memory storage device, such that the offloaded data can be communicated from the second device to the platform. For example, user device 1002 may include a near-field communication module configured to communicate with computing devices that are physically proximate (e.g., within several inches of the user device), a removable memory storage device, a data port configured to receive a cable or other connector, and/or any other component(s) configured to facilitate data transfer from the user device to a second device configured to communicate the data to the platform.

In some examples, user device 1002 is configured to allow a user to interact with the platform via a software application (AKA an app) executed by the user device. In some examples, user device 1002 is configured to allow a user to interact with the platform via a web browser executed by the user device. In some examples, however, user device 1002 is not configured to allow a user to interact with the platform (other than facilitating data upload to the platform), and the user uses a different device(s) when interacting with the platform.

In some examples, user device 1002 further includes processing logic 1008 configured to process data (e.g., data sensed by sensors 1004) by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware. Processing logic 1008 may be configured to control sensor 1004, communication unit 1006, and/or any other suitable components of the user device. In some examples, processing logic 1008 is configured to process sensed data before (or as) the data is communicated to platform 1000 and/or to another device. Processing the sensed data may include preparing it for transmission (e.g., by compressing it, adding suitable metadata, and/or the like) and/or performing analysis on the data (e.g., determining metrics, statistics, and/or other information based on the sensed data).

Depending on the example, processing may be performed by the user device, by processor(s) accessed by the platform, or both. For example, in some cases the sensors of the user device acquire a series of timestamped GPS coordinates representing a route traveled by the user during a particular trip. From this data, information about a user's speed may be computed and, in some examples, combined with the relative speed of a passing vehicle to calculate absolute passing speed. In some examples, the speed is computed onboard the user device and the speed data is uploaded to the platform (e.g., along with, or instead of, the timestamped location data). Alternatively, or additionally, the timestamped location data may be uploaded to the platform and the speed data may be computed platform-side rather than by the user device.

Platform 1000 includes one or more data stores configured to store data received from one or more user devices. As described above, the received data may include the data sensed by the sensor(s) of the user device(s), data obtained by analysis of the sensed data performed by processing logic of the user device, and/or any other suitable data received from the user devices.

In this example, platform 1000 includes at least a data store 1010 configured to store user-specific data for a plurality of users and a data store 1012 configured to store aggregate user data. User-specific data stored at data store 1010 may comprise any suitable data associated with a given user. For example, the user-specific data of a given user may include data uploaded by one or more user devices of the user in question. In some examples, user-specific data includes a profile associated with the user. In some examples, the user-specific data also includes settings and data associated with a user's account on the platform (e.g., login credentials, user preferences, and/or any other suitable data). Additional examples of user-specific data are described below in Section J.

Aggregate user data includes data associated with all or a subset of platform users. For example, aggregate user data may include some or all of the user-specific data of some or all users of the platform. In some examples, the aggregate data additionally (or alternatively) includes data generated based on aggregate user-specific data (e.g., statistics, analytics, metadata, and/or the like). In some examples, the aggregate user data is anonymized (e.g., such that data originating in a given user's user-specific data is unassociated with any identifying information, such as names or account numbers, in the aggregate data store). Additional examples of aggregate data are described below in Section K.

In some examples, platform 1000 includes one or more social media network features 1014. Social media network features 1014 may include user profiles, user communication media (e.g., direct messaging, forums, platforms in which a message posted by one user is visible to some or all other users, and/or any other suitable channels of communication), events in which users can participate, gamification features, and/or any other suitable social networking features. In some examples, social media network features 1014 include awards a user may receive, milestones a user may reach, and/or events users may participate in, examples of which are described below in Section L. User awards, milestones, and/or events may additionally or alternatively be included in other aspects of the platform (e.g., as user-specific data associated with a user's profile).

Optionally, platform 1000 may be configured to communicate with one or more third-party systems 1016 (e.g., third-party websites, platforms, social media networks, and/or any other suitable system). In some examples, platform 1000 is configured to facilitate a user sharing information associated with platform 1000 on a third-party social media network, or vice versa. For example, platform 1000 may be configured to permit a user to conveniently share information, an achievement, a message, an image, and/or any other suitable data of platform 1000 on a third-party social media network in a format, such as a post or direct message, typical of and/or native to the third-party network.

As another example, platform 1000 may be configured to allow a user to import data associated with a different platform to platform 1000 and/or to export data from platform 1000 to a different platform. This functionality may, for example, allow a user to begin using platform 1000 instead of (or in addition to) another platform and/or service. For example, a user may import data to platform 1000 from another platform having data relevant to a user's micromobility usage (e.g., a platform including data involving a user's cycling, running, and/or other fitness data; locational or navigational data relating to places and/or routes a user may travel using micromobility; data relating to a user's health and/or fitness; and/or any other suitable data).

As yet another example, platform 1000 may be configured to receive any other potentially useful data from a third-party system or data store. For example, the platform may be configured to receive weather data from a weather platform (e.g., to provide users with real-time weather conditions and/or forecast future conditions for a particular location), traffic data (e.g., from traffic cameras, traffic-tracking websites, local news websites, and/or any other suitable source), and/or any other suitable data from any other suitable source.

As yet another example, platform 1000 may be configured to be accessed by a third-party system configured to perform analytics on data of platform 1000. For example, a third party may perform analysis on data of platform 1000 for market research for a product and/or service; for research on public health, transportation, and/or any other suitable field; and/or for any other suitable purpose.

Platform 1000 is configured to be accessed by user(s) in any suitable manner. For example, a user may interact with the platform to upload captured micromobility data, and/or to view and/or download any suitable data, statistics, social media features, maps, and/or any other suitable aspects of the platform via any suitable device. Suitable devices may include, without limitation, a mobile phone running a suitable app, a computing device providing a web-based interface such as a web browser, a computing device executing any other suitable software program, a bike computer, a GPS watch, a wearable device, a head-up display, smart glasses, and/or any other suitable device(s). As described above, platform 1000 is configured to receive user data uploaded from a user device (e.g., a mobile phone, bike computer, GPS watch, and/or any other suitable device). In some examples, data may be captured by a device configured to collect data associated with a user's use of micromobility (e.g., an image-capture device mounted to a user's micromobility vehicle) and uploaded to the platform via a mobile phone (e.g., via a bike computer app, web browser, web-based app, and/or other suitable software of the mobile phone) configured to receive the captured data from the data-collection device.

J. Illustrative User-Specific Data

This section describes, without limitation, illustrative examples of user data associated with a particular user's micromobility trip or trip segment suitable for use in a digital platform such as platform 1000.

As described below in Section K, in some examples the platform may additionally include aggregated data comprising aggregations of one or more of the following types of data of two or more users.

Examples of suitable data may include the following:
Relative and absolute approach speed and/or velocity (e.g., of vehicle(s) approaching a user's micromobility vehicle);
Relative and absolute passing speed and/or velocity (e.g., of vehicle(s) passing a user's micromobility vehicle);
Closest approach distance and/or vector position of a potential threat to a user's micromobility vehicle;
Number, frequency, and/or other information related to near misses (a near miss being, e.g., an instance of a vehicle being within a predefined distance of a user's micromobility vehicle, such as a within a defined radius);
Number of potential threats (e.g., motor vehicles, other micromobility users, dogs, etc.) and/or number of potential threats per unit time, per unit distance, within a certain spatial area, and/or per trip;
Type of potential threat (e.g. car, bus, truck, motorcycle, bike, scooter, dog, parked vehicles, roadside objects, road debris, etc.)
Information related to the approach of a potential threat (e.g., an azimuthal position of an aggressor and/or an aggressor's "handedness"—e.g., whether the aggressor is approaching from left or right side of the user);
Known or suspected collisions (e.g., between a user and a moving and/or stationary object), and/or known or suspected mishaps (e.g., a user's micromobility vehicle becoming stuck, falling, and/or otherwise experiencing an abnormal condition);
Width of a bike lane and/or road shoulder (e.g., being traveled by the user);
Proximity to a curb or roadway marking;
Solar alignment with user's route of travel (e.g., indication that the sun is in the eyes of the user and/or the eyes of the drivers or riders of other vehicles);
A potential threat's trajectory (e.g., relative to the user, and/or in absolute terms such as a compass direction);
A potential threat's velocity and/or acceleration (e.g., absolute and/or relative to the user);
Weather conditions (e.g., at a user's general location and/or at one or more portions of their route);
User speed and/or vehicle motor rpm or pedaling cadence;
Roadway surface conditions (e.g., wetness, roughness, amount of debris, etc.) based on accelerometer data, image analysis, and/or any other suitable data;
Roadway gradient and/or elevation change(s);
Systematic visibility (e.g., a maximum line of sight distance based on road geometry (e.g., curves, steep hills, etc.) and/or fixed obscurations (vegetation, roadway and roadside structures, etc.));
Transient Visibility (e.g., maximum line of sight distance based on temporary obscurations such as fog, smoke, smog, haze, rain, large vehicle traffic, temporary obscurations in the roadway or roadside such as parked vehicles, etc.)).

In some examples, user data such as the above example data is timestamped and/or geotagged. Timestamps and/or geotags may be created (e.g., automatically) upon capture of the data by the user's data-collecting device. For instance, a camera may automatically timestamp and/or geotag collected images. Alternatively, or additionally, a user may add a timestamp and/or geotag to the data separately (e.g., before, during, or after uploading the data to the platform). Timestamps and/or geotags may facilitate data processing, analytics, and/or platform features such as map overlay. The map overlay may represent individual metrics, as outlined above; calculated risk metrics generated from a suitably weighted combination of other metrics; and/or any other suitable metrics and/or data. Risk metrics may be based on historical data, current conditions, and/or a combination thereof. For example, risk metrics may be based on data that is updated in real time or near real time to factor in transient conditions (e.g., adverse weather conditions; objects such as debris, trash cans, or construction equipment temporarily blocking a bike lane; and/or other suitable conditions).

K. Illustrative Aggregate Data

This section describes, without limitation, illustrative examples of data and/or metrics that may be drawn from a subset (or entirely) of user data of a digital micromobility platform, such as platform 1000. In some examples, the user data making up the aggregated data is at least partially anonymized, such that a piece of data of the aggregated data set cannot be traced back readily (or at all) to the user from whose user data that piece of data was drawn.

Examples of suitable data may include the following:

Any of the examples of user data provided in Section J above;

Number and/or frequency of unique users uploading data for a given route, route segment, and/or geographic area;

Number and/or frequency of commute events (e.g., instances that a user has uploaded data indicating a commuting trip) for a given route, route segment, and/or geographic area;

Statistics relating to users uploading data and/or commute events for a given route, route segment, and/or geographic area, such as statistics relating to user demographic data, data characterizing a user's micromobility usage (e.g., vehicle type, frequency or recency of travel by micromobility, typical speed and/or length of trip, etc.) and/or any other suitable user features;

Statistics about the number of potentially hazardous and/or inconvenient events associated with user data corresponding to a particular route, route segment, and/or geographic area.

L. Illustrative User Events, Awards, and/or Milestones

This section describes, without limitation, illustrative awards a user may receive on a digital micromobility platform such as platform 1000, milestones a user may reach (e.g., based on their user data) on the platform, and/or events that one or more users may participate in on the platform. An award, milestone achievement, and/or indication of event participation may appear on a user's profile, be shareable by a user via social media network feature(s) of the platform, and/or otherwise be accessible on the platform in any other suitable manner.

Examples of suitable milestones, awards, and/or events include the following:

Awards for amount of time, distance, and/or number of trips traveled using micromobility transportation per unit time (e.g., per week, month, year, etc.) for defined groups of users (e.g., for an individual user, for a group of friends defined on the platform, for users who are employees of a particular employer, for users who are members of a team defined on the platform, for all users in a given demographic group and/or geographic area, for all users of the platform, etc.). For example, among a group of friends defined in a social media feature of the platform, the user who has traveled the greatest number of miles by micromobility in a particular month may receive an award, and the award may be displayed and/or otherwise indicated on their platform profile.

Number of micromobility trips taken (e.g., in a particular time interval and/or over all time);

Number of miles traveled by micromobility (e.g., in a particular time interval and/or over all time);

Equivalent carbon offset and/or fuel cost savings (e.g., corresponding to a number of miles traveled by micromobility rather than motor vehicle, in a particular time interval and/or over all time);

Number of days in a row in which micromobility was used (e.g., "streaks");

Achieving a goal (e.g., an aspirational streak of micromobility usage, total number of miles traveled by micromobility, and/or any other suitable goal) defined by a user and/or group of users;

Increased micromobility activity compared to a previous time interval (and optionally, notification of decreased micromobility activity compared to a previous time interval);

Periodic incentive awards (e.g., participation in micromobility usage for Earth Day, Bike to Work Day, and/or any other suitable event);

Total distance mapped and shared with others on the social media platform over a given time interval (e.g., weeks, months, or years);

Number of unique routes mapped and shared with others on the social media platform over a given time interval (e.g., weeks, months, or years.)

M. Illustrative Map Features

Figure 20:
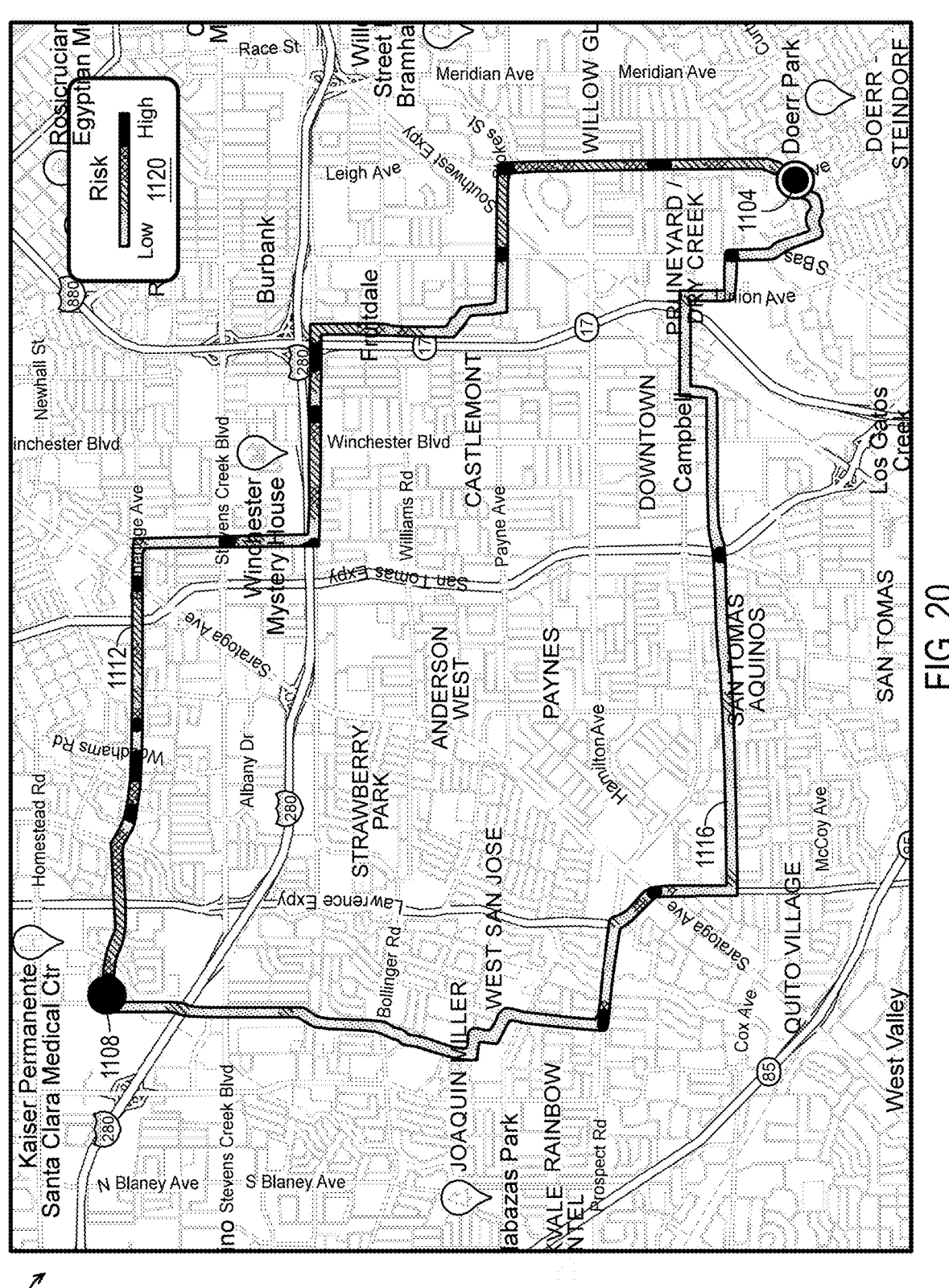
FIG. 20 is a schematic diagram depicting an illustrative map associated with the digital platform of FIG. 19, in accordance with aspects of the present disclosure.

With reference to FIG. 20, this section describes an illustrative map 1100 suitable for use in a digital micromobility platform such as platform 1000. Map 1100 shows the calculated risk metric overlay for two independent routes from the same origination and destination points, highlighting the difference in risk calculated by metrics measured from a situational awareness device. Users may use such map overlays when trading off the level of risk they are comfortable with versus other factors, such as travel time, travel distance, or elevation gain, during their micromobility trip use. Platform 1000 may be configured to display any of a plurality of maps, of which map 1100 is an example. For example, a user interface of a mobile phone app accessing platform 1000 may display map 1100 to a user.

Map 1100 displays a starting point 1104 at which a user would like to begin traveling and an ending point 1108 at which the user would like to arrive. Map 1100 further displays first and second routes 1112 and 1116 along which a user could travel from starting point 1104 to ending point 1108. Information about risk levels associated with routes 1112, 1116 is overlaid on map 1100. In the depicted example, a visual pattern is overlaid on the routes, with a pattern containing more white indicating a lower risk and a pattern containing more black indicating a higher risk. The correspondence between the visual pattern and the indicated risk level is shown in key 1120 inset on the map. In general, any suitable manner of visually indicating risk level along the routes may be used (e.g., other patterns, color, brightness, line thickness, symbols, etc.).

At the moment depicted in FIG. 20, route 1116 is shown to carry a generally lower risk than route 1112 along most of the respective lengths of the routes. In some examples, the information overlaid on the routes may be updated in real time, on demand, and/or at any suitable interval(s).

In the depicted example, routes 1112, 1116 are overlaid with overall risk levels, ranging from low risk to high risk. The overall risk levels may be determined based on any suitable risk factor(s). In general, routes on map 1100 may be overlaid or otherwise labeled with any suitable data that a micromobility traveler may find relevant, such as aggregated user data relating to the frequency or severity of problems platform users have encountered while traveling that route; information about the width of a bike lane on the route; real-time information about weather, solar angles, visibility, temporary obstructions, road surface conditions, or traffic along the route; and/or any other suitable information, including any suitable information described elsewhere herein. In some examples, one or more routes are each overlaid with more than one type of information (e.g., both weather information and traffic information, conveyed by distinguishable visual effects).

In some examples, one or more routes such as routes 1112 or 1116 are saved in a data store of the app and can be retrieved and presented to users (e.g., in response to the user requesting that a specific route be displayed on the map and/or in response to a user requesting the platform provide a route meeting, e.g., one or more criteria). In some examples, the platform is configured to generate a new route (e.g., a route not previously saved in a data store of the platform) to a user (e.g., based on one or more criteria such as suitable road conditions, a lack of temporary obstructions, a prediction of low probability of encounters with threats, and/or any other suitable basis).

N. Illustrative Data Processing System

Figure 21:
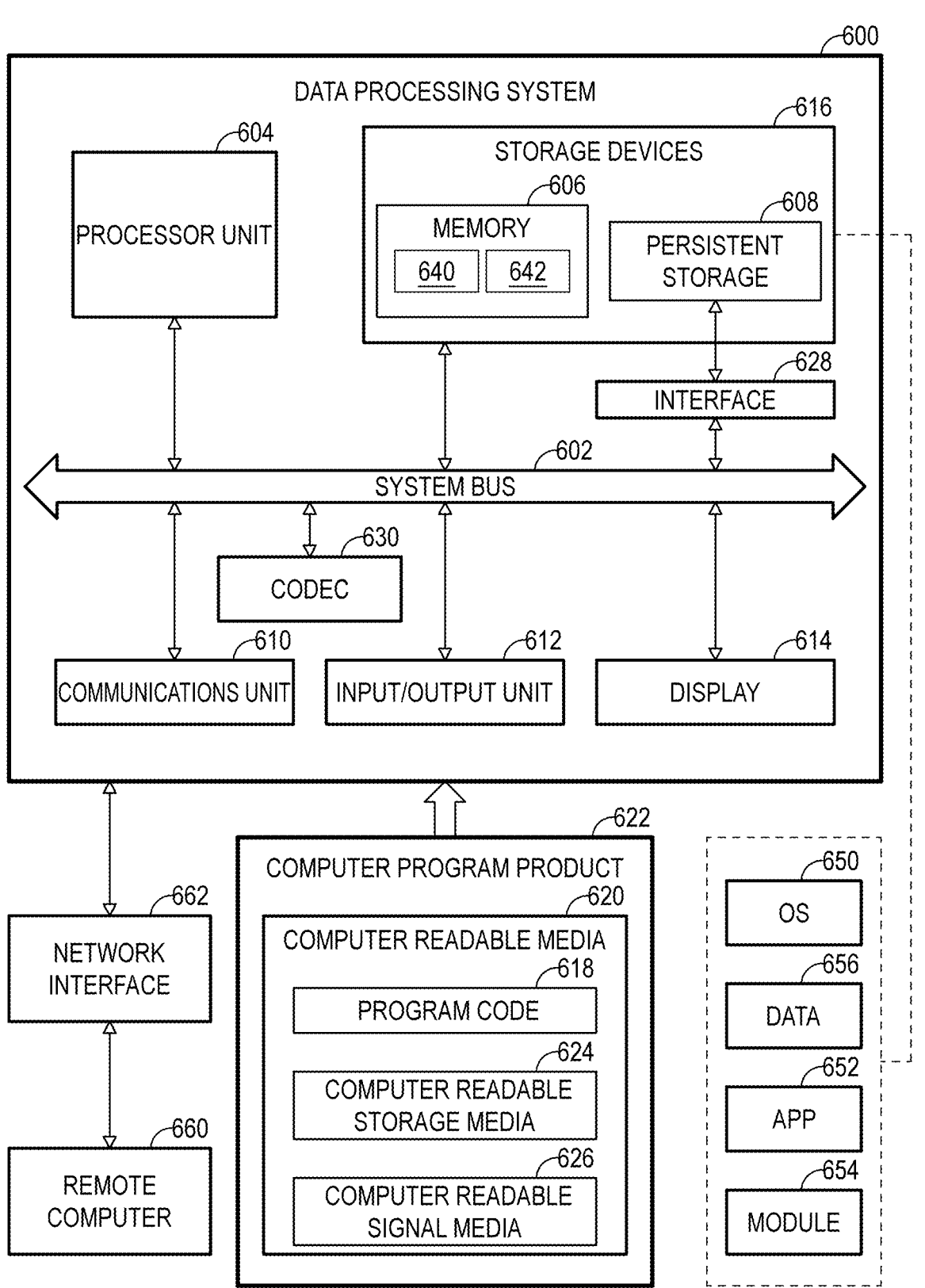
FIG. 21 is a schematic diagram depicting an illustrative data processing system in accordance with aspects of the present disclosure.

As shown in FIG. 21, this example describes a data processing system 600 (also referred to as a computer, computing system, and/or computer system) in accordance with aspects of the present disclosure. In this example, data processing system 600 is an illustrative data processing system suitable for implementing aspects of the situational awareness systems described above. For example, onboard and offboard computers of situational awareness systems are examples of data processing systems. As another example, a digital platform may include one or more data processing systems and/or may be accessed by one or more user devices comprising data processing systems.

In this illustrative example, data processing system 600 includes a system bus 602 (also referred to as communications framework). System bus 602 may provide communications between a processor unit 604 (also referred to as a processor or processors), a memory 606, a persistent storage 608, a communications unit 610, an input/output (I/O) unit 612, a codec 630, and/or a display 614. Memory 606, persistent storage 608, communications unit 610, input/output (I/O) unit 612, display 614, and codec 630 are examples of resources that may be accessible by processor unit 604 via system bus 602.

Processor unit 604 serves to run instructions that may be loaded into memory 606. Processor unit 604 may comprise a number of processors, a multi-processor core, and/or a particular type of processor or processors (e.g., a central processing unit (CPU), graphics processing unit (GPU), etc.), depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device may include any suitable hardware capable of storing information (e.g., digital information), such as data, program code in functional form, and/or other suitable information, either on a temporary basis or a permanent basis.

Storage devices 616 also may be referred to as computer-readable storage devices or computer-readable media. Memory 606 may include a volatile storage memory 640 and a non-volatile memory 642. In some examples, a basic input/output system (BIOS), containing the basic routines to transfer information between elements within the data processing system 600, such as during start-up, may be stored in non-volatile memory 642. Persistent storage 608 may take various forms, depending on the particular implementation.

Persistent storage 608 may contain one or more components or devices. For example, persistent storage 608 may include one or more devices such as a magnetic disk drive (also referred to as a hard disk drive or HDD), solid state disk (SSD), floppy disk drive, tape drive, flash memory card, memory stick, and/or the like, or any combination of these.

One or more of these devices may be removable and/or portable, e.g., a removable hard drive. Persistent storage 608 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 608 to system bus 602, a removable or non-removable interface is typically used, such as interface 628.

Input/output (I/O) unit 612 allows for input and output of data with other devices that may be connected to data processing system 600 (i.e., input devices and output devices). For example, an input device may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 604 through system bus 602 via interface port(s). Suitable interface port(s) may include, for example, a serial port, a parallel port, a game port, and/or a universal serial bus (USB).

One or more output devices may use some of the same types of ports, and in some cases the same actual ports, as the input device(s). For example, a USB port may be used to provide input to data processing system 600 and to output information from data processing system 600 to an output device. One or more output adapters may be provided for certain output devices (e.g., monitors, speakers, and printers, among others) which require special adapters. Suitable output adapters may include, e.g., video and sound cards that provide a means of connection between the output device and system bus 602. Other devices and/or systems of devices may provide both input and output capabilities, such as remote computer(s) 660. Display 614 may include any suitable human-machine interface or other mechanism configured to display information to a user, e.g., a CRT, LED, or LCD monitor or screen, etc.

Communications unit 610 refers to any suitable hardware and/or software employed to provide for communications with other data processing systems or devices. While communication unit 610 is shown inside data processing system 600, it may in some examples be at least partially external to data processing system 600. Communications unit 610 may include internal and external technologies, e.g., modems (including regular telephone grade modems, cable modems, and DSL modems), ISDN adapters, and/or wired and wireless Ethernet cards, hubs, routers, etc. Data processing system 600 may operate in a networked environment, using logical connections to one or more remote computers 660. A remote computer(s) 660 may include a personal computer (PC), a server, a router, a network PC, a workstation, a microprocessor-based appliance, a peer device, a smart phone, a tablet, another network note, and/or the like. Remote computer(s) 660 typically include many of the elements described relative to data processing system 600. Remote computer(s) 660 may be logically connected to data processing system 600 through a network interface 662 which is connected to data processing system 600 via communications unit 610. Network interface 662 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like.

WAN technologies include point-to-point links, circuit switching networks (e.g., Integrated Services Digital networks (ISDN) and variations thereon), packet switching networks, and Digital Subscriber Lines (DSL).

Codec 630 may include an encoder, a decoder, or both, comprising hardware, software, or a combination of hardware and software. Codec 630 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 630 is depicted as a separate component, codec 630 may be contained or implemented in memory, e.g., non-volatile memory 642.

Non-volatile memory 642 may include read only memory (ROM), programmable ROM (PROM), electrically programmable ROM (EPROM), electrically erasable programmable ROM (EEPROM), flash memory, and/or the like, or any combination of these. Volatile memory 640 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 616, which are in communication with processor unit 604 through system bus 602. In these illustrative examples, the instructions are in a functional form in persistent storage 608. These instructions may be loaded into memory 606 for execution by processor unit 604. Processes of one or more embodiments of the present disclosure may be performed by processor unit 604 using computer-implemented instructions, which may be located in a memory, such as memory 606.

These instructions are referred to as program instructions, program code, computer usable program code, or computer-readable program code executed by a processor in processor unit 604. The program code in the different embodiments may be embodied on different physical or computer-readable storage media, such as memory 606 or persistent storage 608. Program code 618 may be located in a functional form on computer-readable media 620 that is selectively removable and may be loaded onto or transferred to data processing system 600 for execution by processor unit 604. Program code 618 and computer-readable media 620 form computer program product 622 in these examples. In one example, computer-readable media 620 may comprise computer-readable storage media 624 or computer-readable signal media 626.

Computer-readable storage media 624 may include, for example, an optical or magnetic disk that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory, that is connected to data processing system 600. In some instances, computer-readable storage media 624 may not be removable from data processing system 600.

In these examples, computer-readable storage media 624 is a non-transitory, physical or tangible storage device used to store program code 618 rather than a medium that propagates or transmits program code 618. Computer-readable storage media 624 is also referred to as a computer-readable tangible storage device or a computer-readable physical storage device. In other words, computer-readable storage media 624 is media that can be touched by a person.

Alternatively, program code 618 may be transferred to data processing system 600, e.g., remotely over a network, using computer-readable signal media 626. Computer-readable signal media 626 may be, for example, a propagated data signal containing program code 618. For example, computer-readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer-readable signal media 626 for use within data processing system 600. For instance, program code stored in a computer-readable storage medium in a server data processing system may be downloaded over a network from the server to data processing system 600. The computer providing program code 618 may be a server computer, a client computer, or some other device capable of storing and transmitting program code 618.

In some examples, program code 618 may comprise an operating system (OS) 650. Operating system 650, which may be stored on persistent storage 608, controls and allocates resources of data processing system 600. One or more applications 652 take advantage of the operating system's management of resources via program modules 654, and program data 656 stored on storage devices 616. OS 650 may include any suitable software system configured to manage and expose hardware resources of computer 600 for sharing and use by applications 652. In some examples, OS 650 provides application programming interfaces (APIs) that facilitate connection of different type of hardware and/or provide applications 652 access to hardware and OS services. In some examples, certain applications 652 may provide further services for use by other applications 652, e.g., as is the case with so-called "middleware." Aspects of present disclosure may be implemented with respect to various operating systems or combinations of operating systems.

The different components illustrated for data processing system 600 are not meant to provide architectural limitations to the manner in which different embodiments may be implemented. One or more embodiments of the present disclosure may be implemented in a data processing system that includes fewer components or includes components in addition to and/or in place of those illustrated for computer 600. Other components shown in FIG. 21 can be varied from the examples depicted. Different embodiments may be implemented using any hardware device or system capable of running program code. As one example, data processing system 600 may include organic components integrated with inorganic components and/or may be comprised entirely of organic components (excluding a human being). For example, a storage device may be comprised of an organic semiconductor.

In some examples, processor unit 604 may take the form of a hardware unit having hardware circuits that are specifically manufactured or configured for a particular use, or to produce a particular outcome or progress. This type of hardware may perform operations without needing program code 618 to be loaded into a memory from a storage device to be configured to perform the operations. For example, processor unit 604 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 618) may be implemented as hardware, e.g., by specifying an FPGA configuration using a hardware description language (HDL) and then using a resulting binary file to (re) configure the FPGA.

In another example, data processing system 600 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, system bus 602 may comprise one or more buses, such as a system bus or an input/output bus. Of course, the bus system may be implemented using any suitable type of architecture that provides for a transfer of data between different components or devices attached to the bus system. System bus 602 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in system bus 602.

O. Illustrative Distributed Data Processing System

Figure 22:
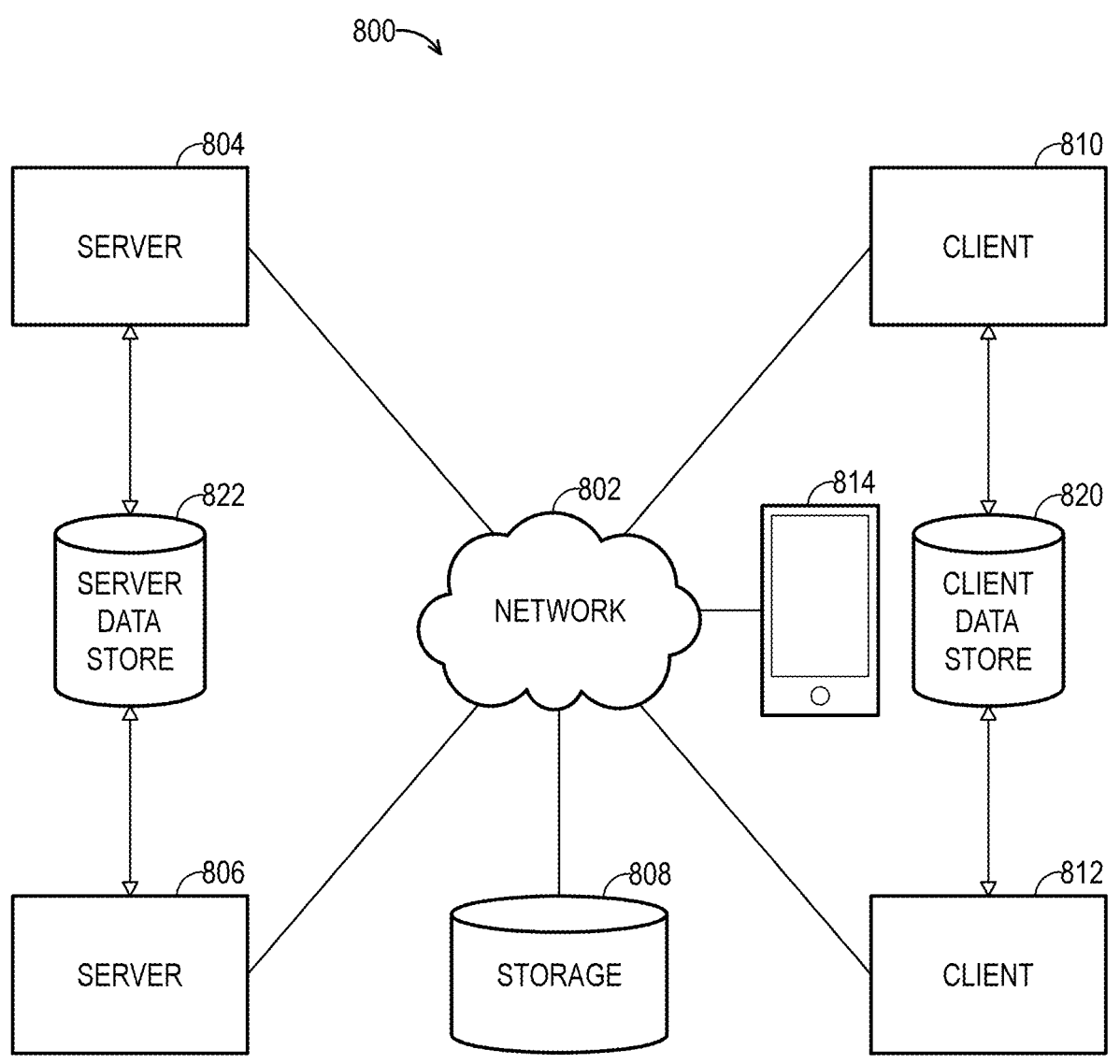
FIG. 22 is a schematic diagram depicting an illustrative network data processing system in accordance with aspects of the present disclosure.

As shown in FIG. 22, this example describes a general network data processing system 800, interchangeably termed a computer network, a network system, a distributed data processing system, or a distributed network, aspects of which may be included in and/or used in conjunction with illustrative embodiments of situational awareness devices and/or digital platforms described herein. For example, a situational awareness device may be configured to communicate with a digital platform and/or with any other suitable system via a network. As another example, a digital platform may be configured to communicate with any suitable device or system via a network.

It should be appreciated that FIG. 22 is provided as an illustration of one implementation and is not intended to imply any limitation with regard to environments in which different embodiments may be implemented. Many modifications to the depicted environment may be made.

Network system 800 is a network of devices (e.g., computers), each of which may be an example of data processing system 600, and other components. Network data processing system 800 may include network 802, which is a medium configured to provide communications links between various devices and computers connected within network data processing system 800. Network 802 may include connections such as wired or wireless communication links, fiber optic cables, and/or any other suitable medium for transmitting and/or communicating data between network devices, or any combination thereof.

In the depicted example, a first network device 804 and a second network device 806 connect to network 802, as do one or more computer-readable memories or storage devices 808. Network devices 804 and 806 are each examples of data processing system 600, described above. In the depicted example, devices 804 and 806 are shown as server computers, which are in communication with one or more server data store(s) 822 that may be employed to store information local to server computers 804 and 806, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 810 and 812 and/or a client smart device 814, may connect to network 802. Each of these devices is an example of data processing system 600, described above regarding FIG. 21. Client electronic devices 810, 812, and 814 may include, for example, one or more personal computers, network computers, and/or mobile computing devices such as personal digital assistants (PDAs), smart phones, handheld gaming devices, wearable devices, and/or tablet computers, and the like. In the depicted example, server 804 provides information, such as boot files, operating system images, and applications to one or more of client electronic devices 810, 812, and 814. Client electronic devices 810, 812, and 814 may be referred to as "clients" in the context of their relationship to a server such as server computer 804. Client devices may be in communication with one or more client data store(s) 820, which may be employed to store information local to the clients (e.g., cookie(s) and/or associated contextual information). Network data processing system 800 may include more or fewer servers and/or clients (or no servers or clients), as well as other devices not shown.

In some examples, first client electric device 810 may transfer an encoded file to server 804. Server 804 can store the file, decode the file, and/or transmit the file to second client electric device 812. In some examples, first client electric device 810 may transfer an uncompressed file to server 804 and server 804 may compress the file. In some examples, server 804 may encode text, audio, and/or video information, and transmit the information via network 802 to one or more clients.

Client smart device 814 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 800 may be stored in or on a computer-readable storage medium, such as network-connected storage device 808 and/or a persistent storage 608 of one of the network computers, as described above, and may be downloaded to a data processing system or other device for use. For example, program code may be stored on a computer-readable storage medium on server computer 804 and downloaded to client 810 over network 802, for use on client 810. In some examples, client data store 820 and server data store 822 reside on one or more storage devices 808 and/or 608.

Network data processing system 800 may be implemented as one or more of different types of networks. For example, system 800 may include an intranet, a local area network (LAN), a wide area network (WAN), or a personal area network (PAN). In some examples, network data processing system 800 includes the Internet, with network 802 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 802 may be referred to as a "cloud." In those examples, each server 804 may be referred to as a cloud computing node, and client electronic devices may be referred to as cloud consumers, or the like. FIG. 22 is intended as an example, and not as an architectural limitation for any illustrative embodiments.

P. Illustrative Method for Providing Situational Awareness for a User of a Micromobility Vehicle This section describes steps of an illustrative method 1200 for providing situational awareness for a user of a micromobility vehicle (e.g., a cyclist); see FIG. 23. Aspects of systems, components, and methods described above may be utilized in the method steps described below; however, the systems, components, and methods described above are not intended to limit the possible ways of carrying out any particular step of the method.

FIG. 23 is a flowchart illustrating steps performed in method 1200. In some examples, the illustrated steps are performed in conjunction with additional steps not illustrated in FIG. 23. Furthermore, in some examples, the illustrated steps need not necessarily all be performed. In some cases, the illustrated steps are performed simultaneously or in a different order than the order shown.

At step 1202, method 1200 includes capturing first and second pairs of stereo images using a stereo image capture device traveling with the micromobility vehicle. The device may, e.g., be an example of system 100, described above. The device may be attached to the vehicle and/or to the user of the vehicle in any suitable manner. The first pair of stereo images is captured at a first time and the second pair of stereo images is captured at a second time, which is later than the first time. Each of the first and second pairs of stereo images includes respective first and second images.

At step 1204, method 1200 includes performing steps 1206, 1208, and 1210 for each of the first and second pairs of stereo images. Step 1206 includes determining a boundary encompassing the object in the first image of the pair. Step 1208 includes determining a disparity between a first position of the boundary, at which the boundary encompasses the object in the first image, and a second position of the boundary, at which the boundary encompasses the object in the second image. Step 1210 includes determining a distance from the object based on the disparity.

At step 1212, method 1200 includes determining, based on the distances determined for the first and second pairs of stereo images, a rate of approach of the object.

At step 1214, which is optional, method 1200 includes determining an angular position of the object relative to the micromobility vehicle based on at least one of the first and second images of at least one of the first and second pairs of stereo images, and determining a threat level posed by the object to the micromobility vehicle based on the rate of approach and the angular position of the object.

At step 1216, which is optional, method 1200 includes producing an auditory alert in response to determining a threat level that meets or exceeds a threshold threat level.

At step 1218, which is optional, method 1200 includes displaying first data on a display traveling with the micromobility vehicle. The first data includes the threat level and a relative position of the object to the micromobility vehicle, the relative position being based on the distance from the object and the angular position of the object.

Q. Illustrative Combinations and Additional Examples

This section describes additional aspects and features of situational awareness systems and methods and digital micromobility platforms, presented without limitation as a series of paragraphs, some or all of which may be alphanumerically designated for clarity and efficiency. Each of these paragraphs can be combined with one or more other paragraphs, and/or with disclosure from elsewhere in this application, including any materials listed in the Cross-References, in any suitable manner. Some of the paragraphs below may expressly refer to and further limit other paragraphs, providing without limitation examples of some of the suitable combinations.

A0. A product comprising any feature described herein, either individually or in combination with any other such feature, in any configuration.

B0. A computer program product comprising any feature described herein, either individually or in combination with any other such feature, in any configuration.

C0. A computer system comprising any feature described herein, either individually or in combination with any other such feature, in any configuration.

D0. A software application configured to facilitate user access to a digital platform comprising any feature described herein, either individually or in combination with any other such feature, in any configuration.

E0. A process for obtaining, determining, and/or providing information relating to situational awareness for a cyclist, the process comprising any process step described herein, in any order, using any modality.

F0. A system for providing situational awareness, the system comprising:

a stereo camera assembly comprising a first camera and a second camera disposed in a stereo configuration;

processing logic coupled to the first and second cameras, the processing logic configured to:

control the first and second cameras to acquire respective first and second stereo images, wherein each of the first and second stereo images includes an object of interest;

determine a bounding shape encompassing the object of interest within the first stereo image, the bounding shape having a first position within the first stereo image;

determine a second position within the second stereo image at which the bounding shape encompasses the object of interest in the second stereo image;

determine a displacement between the first position and the second position; and determine, based on the displacement, a distance between the stereo camera assembly and the object of interest.

F1. The system of paragraph F0, wherein the first position and the second position are each defined by an index identifying an image pixel at which a predetermined portion of the bounding shape is disposed.

F2. The system of any one of paragraphs F0-F1, wherein the bounding shape is a rectangular box.

F3. The system of any one of paragraphs F0-F2, wherein the processing logic is further configured to determine, based on at least one of the first and second stereo images, an angular position of the object of interest relative to the stereo assembly.

F4. The system of any one of paragraphs F0-F3, wherein the processing logic is further configured to, based on at least one of the first and second stereo images, classify the object of interest as belonging to a first category of a plurality of categories, wherein the plurality of categories includes at least one of "motor vehicle" and "bicycle."

F5. The system of paragraph F4, wherein the processing logic is further configured to:

control the first and second cameras to, after acquiring the first and second stereo images, acquire updated first and second stereo images;

determine, based on the updated first and second stereo images, an updated distance between the stereo assembly and the object of interest; and determine, based on the distance, the updated distance, and a time interval between acquiring the first and second stereo images and acquiring the updated first and second stereo images, a speed of the object of interest.

F6. The system of paragraph F5, wherein the processing logic is further configured to identify, based on the speed of the object of interest and the first category, a threat level indicating a degree of threat posed by the object of interest to a micromobility vehicle carrying the stereo assembly.

F7. The system of paragraph F6, further comprising a sound-emitting device, and wherein the processing logic is further configured to:

in response to identifying a threat level meeting or exceeding a predetermined threshold threat level, cause the sound-emitting device to emit an audio indication.

F8. The system of paragraph F7, wherein at least one property of the audio indication is selected based on the threat level.

G0. A system for providing situational awareness for a user of a personal vehicle, the system comprising:

a stereo camera assembly configured to capture pairs of stereo images; and a processor configured to:

cause the stereo camera assembly to capture successive pairs of stereo images, each pair of stereo images including a first image and a second image;

detect a region of interest corresponding to at least a portion of a real-world object appearing in the first and second images of each of the successive pairs of stereo images;

for each pair of the successive pairs of stereo images:

determine a bounding outline bounding the region of interest in the first image, wherein determining the bounding outline includes determining a first position of the bounding outline in the first image, and wherein the bounding outline has first image content when disposed at the first position within the first image;

determine a second position of the bounding outline in the second image such that, when the bounding outline is disposed at the second position in the second image, the bounding outline has second image content matching the first image content according to a predetermined criterion;

determine, based on the first position and the second position, a stereo disparity of the detected region of interest between the first image and the second image; and determine, based on the stereo disparity and a stereo baseline of the stereo camera assembly, a distance between the stereo camera assembly and the real-world object at the time the pair of stereo images was captured; and determine, based on the distances determined for each of the successive pairs of stereo images, a speed of the real-world object relative to the stereo camera assembly.

G1. The system of paragraph G0, wherein the processor is further configured to classify the real-world object as belonging to a first category of a plurality of predetermined categories of object, and wherein the plurality of predetermined categories includes at least the following categories: motor vehicle, bicycle.

G2. The system of any one of paragraphs G0-G1, wherein a ratio of at least one of the distances to the stereo baseline of the stereo camera assembly is at least 125 to 1.

G3. The system of any one of paragraphs G0-G2, wherein the region of interest is a first region of interest and the real-world object is a first real-world object, and the processor is further configured to:

detect, in the successive pairs of stereo images, at least a second region of interest corresponding to at least a portion of a second real-world object; and determine, for each pair of the successive pairs of stereo images, a second distance between the stereo camera assembly and the second real-world object at the time
the pair of stereo images was captured;

determine, based on the second distances determined for
each pair of stereo images of the successive pairs of
stereo images, a speed of the second real-world object
relative to the stereo camera assembly; and determine, based on factors including at least the deter-
mined speeds of the first and second real-world objects
relative to the stereo camera assembly, respective threat
levels of the first and second real-world objects.

G4. The system of paragraph G3, wherein the processor
is further configured to classify the first and second real-
world objects as belonging to respective categories of
object, and the factors further include the respective catego-
ries of the first and second real-world objects.

G5. The system of paragraph G4, wherein the processor
is further configured to determine azimuthal positions of the
first and second real-world objects relative to the stereo
camera assembly, and the factors further include the deter-
mined azimuthal positions.

H0. A method for providing situational awareness for a
user of a micromobility vehicle, the method comprising:

using a stereo image capture device traveling with the
micromobility vehicle, capturing a first pair of stereo
images at a first time and capturing a second pair of
stereo images at a second time, the second time being
later than the first time, and each of the first and second
pairs of stereo images including a respective first image
and a respective second image;

for each of the first and second pairs of stereo images:
determining a boundary encompassing the object in the
first image of the pair;

determining a disparity between a first position of the
boundary, at which the boundary encompasses the
object in the first image, and a second position of the
boundary, at which the boundary encompasses the
object in the second image; and determining, based on the disparity, a distance from the
object; and determining, based on the distances determined for the
first and second pairs of stereo images, a rate of
approach of the object.

H1. The method of paragraph H0, wherein the boundary
has first image content when disposed at the first position in
the first image, and wherein determining the disparity
between the first and second positions includes rastering the
boundary across the second image between a plurality of
positions including at least the first and second positions,
and identifying the second position as the position of the
plurality of positions at which the contents of the boundary
have a greatest correlation with the first image content.

H2. The method of any one of paragraphs H0-H1, further
comprising:

based on at least one of the first and second images of at
least one of the first and second pairs of stereo images,
determining an angular position of the object relative to
the micromobility vehicle; and determining a threat level posed by the object to the
micromobility vehicle based on the rate of approach
and the angular position of the object.

H3. The method of paragraph H2, further comprising
displaying, on a display traveling with the micromobility
vehicle, first data including the threat level and a relative
position of the object to the micromobility vehicle, the
relative position being based on the distance from the object
and the angular position of the object.

H4. The method of any one of paragraphs H2-H3, further
comprising producing an auditory alert in response to deter-
mining a threat level meeting or exceeding a threshold threat
level.

CONCLUSION

The disclosure set forth above may encompass multiple
distinct examples with independent utility. Although each of
these has been disclosed in its preferred form(s), the specific
embodiments thereof as disclosed and illustrated herein are
not to be considered in a limiting sense, because numerous
variations are possible. To the extent that section headings
are used within this disclosure, such headings are for orga-
nizational purposes only. The subject matter of the disclo-
sure includes all novel and nonobvious combinations and
subcombinations of the various elements, features, func-
tions, and/or properties disclosed herein. The following
claims particularly point out certain combinations and sub-
combinations regarded as novel and nonobvious. Other
combinations and subcombinations of features, functions,
elements, and/or properties may be claimed in applications
claiming priority from this or a related application. Such
claims, whether broader, narrower, equal, or different in
scope to the original claims, also are regarded as included
within the subject matter of the present disclosure.

The invention claimed is:

1. A computer-implemented method for improving micro-
mobility vehicle travel, the method comprising:

collecting, from a plurality of computing devices each
traveling with a respective micromobility vehicle in a
same geographic area, data reflecting hazardous con-
ditions encountered by the corresponding micromobil-
ity vehicle at respective locations;

determining, based on the collected data, respective haz-
ard levels of each of the locations; and generating, based on the determined hazard levels, a map
of at least a portion of the geographic area, wherein the
map includes hazard information based on the deter-
mined hazard levels of the locations;

wherein, for at least one of the micromobility vehicles, the
data reflecting hazardous conditions includes data
reflecting one or more instances in which a second
vehicle was within a predetermined distance of the
micromobility vehicle; and wherein the one or more instances include at least one
instance in which, during a predetermined interval of
time:

the second vehicle was within the predetermined dis-
tance of the micromobility vehicle on a first side of
the micromobility vehicle, and an object was within a second predetermined distance
of the micromobility vehicle on a second side of the
micromobility vehicle.

2. The method of claim 1, wherein generating the map
includes generating a first route between a start point and an
end point, and the first route includes one or more of the
locations.

3. The method of claim 2, wherein generating the map
further includes generating a second route between the start
point and the end point, and the second route includes one
or more of the locations, such that the hazard information
includes hazard information associated with the first route
and hazard information associated with the second route.

4. The method of claim 3, wherein the hazard information includes a respective indication of hazard level at each portion of the first route and at each portion of the second route.

5. The method of claim 1, wherein collecting the data reflecting the one or more instances includes sensing a distance between the micromobility vehicle and the second vehicle using a sensor of the computing device.

6. The method of claim 1, wherein the hazard levels are further based on one or more of the following: surface condition of a roadway, roadway geometry affecting visibility, fixed objects affecting visibility, transient visibility, weather condition, or solar alignment with a user's route of travel.

7. The method of claim 1, further comprising updating the map based on updated information from the plurality of computing devices.

8. The method of claim 7, wherein updating the map includes updating the map in real time.

9. The method of claim 1, further comprising displaying the map at a display of one of the computing devices.

10. A data-processing system comprising:
one or more processors;
a memory;
a plurality of instructions stored in the memory, wherein the plurality of instructions is executable by the one or more processors to:
   receive, from a plurality of computing devices each traveling with a respective micromobility vehicle in a same geographic area, data reflecting hazardous conditions encountered by the corresponding micromobility vehicle at respective locations;
   determine, based on the received data, respective hazard levels of each of the locations; and
   generate, based on the determined hazard levels, a map of at least a portion of the geographic area, wherein the map includes hazard information based on the determined hazard levels of the locations;
   wherein, for at least one of the micromobility vehicles, the data reflecting hazardous conditions includes data reflecting one or more instances in which a second vehicle was within a predetermined distance of the micromobility vehicle; and
   wherein the one or more instances include at least one instance in which, during a predetermined interval of time:

the second vehicle was within the predetermined distance of the micromobility vehicle on a first side of the micromobility vehicle, and
   an object was within a second predetermined distance of the micromobility vehicle on a second side of the micromobility vehicle.

11. The data-processing system of claim 10, wherein the plurality of instructions is further executable by the one or more processors to cause the map to be displayed at a display of one of the computing devices of the plurality of computing devices.

12. The data-processing system of claim 10, wherein generating the map includes generating a first route between a start point and an end point, and the first route includes one or more of the locations.

13. The data-processing system of claim 12, wherein generating the map further includes generating a second route between the start point and the end point, and the second route includes one or more of the locations, such that the hazard information includes hazard information associated with the first route and hazard information associated with the second route.

14. The data-processing system of claim 13, wherein the hazard information includes a respective indication of hazard level at each portion of the first route and at each portion of the second route.

15. The data-processing system of claim 10, wherein the data reflecting the one or more instances includes a sensed distance between the micromobility vehicle and the second vehicle, the sensed distance being sensed by a sensor of the computing device traveling with the micromobility vehicle.

16. The data-processing system of claim 10, wherein the hazard levels are further based on one or more of the following: surface condition of a roadway, roadway geometry affecting visibility, fixed objects affecting visibility, transient visibility, weather condition, or solar alignment with a user's route of travel.

17. The data-processing system of claim 10, wherein the plurality of instructions is further executable by the one or more processors to update the map based on updated information from the plurality of computing devices.

18. The data-processing system of claim 17, wherein updating the map includes updating the map in real time.

* * * * *